US012119570B2

(12) United States Patent
Shao et al.

(10) Patent No.: US 12,119,570 B2
(45) Date of Patent: Oct. 15, 2024

(54) ANTENNA, ANTENNA MODULE, AND WIRELESS NETWORK DEVICE

(71) Applicant: Huawei Technologies Co., Ltd., Shenzhen (CN)

(72) Inventors: Jinjin Shao, Wuhan (CN); Cao Shi, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 17/951,649

(22) Filed: Sep. 23, 2022

(65) Prior Publication Data

US 2023/0020807 A1 Jan. 19, 2023

Related U.S. Application Data

(63) Continuation of application No. PCT/CN2021/081771, filed on Mar. 19, 2021.

(30) Foreign Application Priority Data

Mar. 24, 2020 (CN) ......................... 202010215335.0

(51) Int. Cl.
*H01Q 9/26* (2006.01)
*H01Q 21/24* (2006.01)
*H01Q 21/29* (2006.01)

(52) U.S. Cl.
CPC ............. *H01Q 9/265* (2013.01); *H01Q 21/24* (2013.01); *H01Q 21/29* (2013.01)

(58) Field of Classification Search
CPC .......... H01Q 9/265; H01Q 21/24; H01Q 21/29
See application file for complete search history.

(56) References Cited

U.S. PATENT DOCUMENTS

| | | | |
|---|---|---|---|
| 9,711,863 | B2 | 7/2017 | De Luis et al. |
| 9,786,990 | B2 | 10/2017 | Platt |
| 10,355,369 | B1 | 7/2019 | Dawson |
| 2007/0115188 | A1 | 5/2007 | Mizoguchi et al. |
| 2008/0139136 | A1 | 6/2008 | Shtrom et al. |
| 2009/0207092 | A1 | 8/2009 | Nysen et al. |
| 2010/0265041 | A1 | 10/2010 | Almog et al. |
| 2010/0289712 | A1 | 11/2010 | Zheng et al. |
| 2014/0327588 | A1 | 11/2014 | Tran et al. |

(Continued)

FOREIGN PATENT DOCUMENTS

| | | | |
|---|---|---|---|
| CN | 202221809 | U | 5/2012 |
| CN | 103022644 | A | 4/2013 |
| CN | 103956564 | A | 7/2014 |

(Continued)

*Primary Examiner* — Graham P Smith
(74) *Attorney, Agent, or Firm* — Slater Matsil, LLP

(57) ABSTRACT

This application provides an antenna, including a folded antenna, a dipole antenna, and a coupling structure. An extension direction of a primary radiator of the folded antenna is a first direction, an extension direction of a primary radiator of the dipole antenna is a second direction, and the first direction is orthogonal to the second direction. In the second direction, the folded antenna is disposed at one end of the dipole antenna, an operating frequency of the folded antenna is a first frequency band, an operating frequency of the dipole antenna includes a second frequency band, and the first frequency band is higher than the second frequency band. The coupling structure is connected between the folded antenna and the dipole antenna.

20 Claims, 16 Drawing Sheets

(56) References Cited

U.S. PATENT DOCUMENTS

| | | | |
|---|---|---|---|
| 2018/0342790 | A1 | 11/2018 | Oh et al. |

FOREIGN PATENT DOCUMENTS

| | | | |
|---|---|---|---|
| CN | 104037500 | A | 9/2014 |
| CN | 105027352 | A | 11/2015 |
| CN | 108847534 | A | 11/2018 |
| CN | 208093737 | U | 11/2018 |
| CN | 209200134 | U | 8/2019 |
| CN | 209471465 | U | 10/2019 |
| WO | 2006087488 | A1 | 8/2006 |

6.5G-2

6.5G-1

ANTENNA, ANTENNA MODULE, AND WIRELESS NETWORK DEVICE

CROSS-REFERENCE TO RELATED APPLICATIONS

This application is a continuation of International Application No. PCT/CN2021/081771, filed on Mar. 19, 2021, which claims priority to Chinese Patent Application No. 202010215335.0, filed on Mar. 24, 2020. The disclosures of the aforementioned applications are hereby incorporated by reference in their entireties.

TECHNICAL FIELD

This application relates to the communication field, and in particular, to an antenna, an antenna module, and a wireless network device.

BACKGROUND

A specification of a wireless communication product of a home network rapidly develops from 2*2, 4*4 to 8*8, and a frequency band thereof also develops from 2G, 5G to 6G, and even expands in a millimeter-wave band. However, limited by a product appearance design, a user habit, and a scenario, a wireless device of the home network cannot increase in size indefinitely. Therefore, how to implement a high-specification design and internally integrate more high-performance antennas with less impact on each other in an existing product space condition becomes an urgent design requirement. In particular, a new requirement of a forthcoming 6G frequency band means that a quantity of antennas and radio frequency channels increases by N for an N*N MIMO design, and how to place N new independent frequency bands into an existing module to ensure better coverage of 6G without deteriorating Wi-Fi performance of existing 2/5G becomes a challenge that a product needs to overcome to gain technological competitiveness in the Wi-Fi 6 technology. How to use a new technology or a new architecture in an existing environment to reduce an antenna size or quantity and increase an antenna operating frequency band, so as to implement specification upgrade and ensure a high-performance Wi-Fi coverage capability at different frequencies requires urgent consideration of antenna engineers.

SUMMARY

To overcome a reduction in radiation performance of a multi-band antenna in an integration process in the conventional technology, this application provides an antenna to implement horizontal omnidirectional radiation and vertical directional radiation of the antenna in a plurality of frequency bands.

According to a first aspect, this application provides an antenna, including a folded antenna, a dipole antenna, and a coupling structure. An extension direction of a primary radiator of the folded antenna is a first direction, an extension direction of a primary radiator of the dipole antenna is a second direction, and the first direction is orthogonal to the second direction. In the second direction, the folded antenna is disposed at one end of the dipole antenna, an operating frequency of the folded antenna is a first frequency band, an operating frequency of the dipole antenna includes a second frequency band, and the first frequency band is higher than the second frequency band. The coupling structure is connected between the folded antenna and the dipole antenna, in the second frequency band, the coupling structure generates resonance, so that the folded antenna participates in radiation of the dipole antenna, and in the first frequency band, the coupling structure has an isolation function.

The folded antenna is also referred to as a folded dipole antenna, including two primary radiators. In the primary radiator, usually a half-wavelength main dipole and a half-wavelength parasitic dipole are close to each other, and the primary radiators are connected to each other by a using a connecting section. A standing wave current and a standing wave voltage induced by the parasitic dipole and a standing wave current and a standing wave voltage induced by the main dipole have same distribution, and a phase delay may be ignored because a distance is close, coupling is tight, and sizes are the same. The main dipole and the parasitic dipole are close to each other, so that the connecting section therebetween is very short, and hardly participates in radiation.

In this application, the folded antenna and the dipole antenna are integrated together by using the coupling structure. By using an isolation effect in the first frequency band and a straight-through effect in the second frequency band of the coupling structure, the folded antenna may not only execute an operating frequency band of itself, but also participate in the radiation of the dipole antenna in the second frequency band, radiators of the folded antenna may participate in radiation of different antennas, and are independent of each other in performance. By disposing the extension direction of the primary radiator of the folded antenna as the first direction, the extension direction of the primary radiator of the dipole antenna as the second direction, and the first direction to be orthogonal to the second direction, polarization of the folded antenna is orthogonal to polarization of the dipole antenna, thereby implementing high isolation polarization separation and space diversity between the folded antenna and the dipole antenna. The antenna provided in this application has advantages of a small size and good radiation performance.

Specifically, the antenna provided in this application is applied to a wireless network device, for example, a Wi-Fi product. The folded antenna is a half-wave folded antenna with horizontal polarization, and the first frequency band is a high frequency, covering 6 GHz to 7.8 GHz. The dipole antenna is a vertical polarization antenna, including a high-frequency radiator and a low-frequency radiator. The dipole antenna may cover three different frequency band ranges, for example, 2.4G, 5G and 6G. The second frequency band is an operating frequency range of the low-frequency radiator. The folded antenna has a directional radiation characteristic, and the dipole antenna has an omnidirectional radiation characteristic. In this application, the folded antenna and the dipole antenna are integrated into one architecture, achieving advantages of a small size and high performance.

In a possible implementation, the coupling structure includes a first coupling line and a second coupling line, the first coupling line is connected to the folded antenna, the second coupling line is connected to the dipole antenna, a gap is formed between the first coupling line and the second coupling line, and an equivalent inductor and capacitor connected in series are constituted. By using an electromagnetic coupling effect between the first coupling line and the second coupling line, the folded antenna and the dipole antenna are connected together to form an integrated antenna architecture.

When the antenna operates in the second frequency band, a distributed inductor and capacitor formed by the first coupling line and the second coupling line form resonance, so that impedance of a series circuit is small, which is approximate to a direct through-connection. When the antenna operates in the first frequency band, the series circuit formed by the first coupling line and the second coupling line is in a non-resonant state, presents a high impedance characteristic, and is approximate to a disconnected effect. In this implementation, an LC circuit connected in series is formed by using two coupling lines, so that a function of passing a low frequency and preventing a high frequency may be implemented. The coupling structure provided in this application is connected between the folded antenna and the dipole antenna, has advantages of a simple structure and space saving, and facilitates a miniaturized design of an antenna.

In a specific debugging process, a length and a width of each of the first coupling line and the second coupling line and a gap therebetween may be adjusted based on different operating frequency and bandwidth requirements, or a resonance frequency may be adjusted by adjusting extension shapes of the first coupling line and the second coupling line.

In a possible implementation, the first coupling line and the second coupling line are linear, and both an extension direction of the first coupling line and that of the second coupling line are the second direction. In the first direction, a part of the first coupling line and a part of the second coupling line are disposed in a laminated manner, and a gap is formed. The first coupling line and the second coupling line may be disposed in parallel, that is, gaps therebetween are equally distributed, which helps to tune the resonance frequency.

Specifically, the first coupling line is perpendicular to the primary radiator of the folded antenna, and the second coupling line is parallel to the first coupling line.

In a possible implementation, there are two second coupling lines, and the two second coupling lines are disposed in parallel on two sides of the first coupling line. Specifically, the primary radiator of the dipole antenna extends from a first end to a second end in the second direction, the first end is adjacent to the folded antenna, and the second end is away from the folded antenna. An interval space is formed between the first end and the folded antenna, and the coupling structure is disposed in the interval space. The two second coupling lines form two parallel capacitor structures on the two sides of the first coupling line, and a coplanar waveguide-like structure is formed. A coupling factor is increased by using double gaps, so as to implement tune the frequency. In this architecture, a distance between the folded antenna and the dipole antenna can be reduced, that is, a length of a coupled stripline in the second direction can be reduced, which facilitates an overall small-size design of the antenna.

In a possible implementation, the primary radiator of the folded antenna includes a first radiant section and a second radiant section that are oppositely disposed at an interval, and the folded antenna further includes a first connecting section and a second connecting section that are connected between the first radiant section and the second radiant section and that constitute a ring-shaped architecture together with the first radiant section and the second radiant section, and in the second frequency band, the first connecting section and the second connecting section participate in the radiation of the dipole antenna. For the folded antenna, an extension direction of the first radiant section and that of the second radiant section are the first direction, and the first radiant section and the second radiant section are the primary radiators of the folded antenna. In an operating state, current distribution of the first radiant section and that of the second radiant section are in a same direction, and the first connecting section and the second connecting section are connected between the first radiant section and the second radiant section, so as to implement in-phase superposition of radiation energy of the first radiant section and that of the second radiant section.

In this application, a limitation that two radiators of a conventional folded antenna are close to each other is broken through, a horizontal length and a vertical spacing are balanced, and a miniaturized design may be implemented. To design a miniaturized antenna, on the premise that radiation performance of the folded antenna is not effected, in the first direction, a size of the first radiant section and that of the second radiant section are designed from λh/4 to λh/3, in the second direction, a size of the first connecting section and that of the second connecting section are designed from λh/10 to λh/2, and λh is a resonance wavelength of the folded antenna. In this application, on a basis of a conventional folded antenna, a horizontal length is reduced, and a gap between the first radiant section and the second radiant section is opened, so that there is a space difference therebetween, thereby implementing a binary array effect. In the folded antenna provided in this application, a part of the first connecting section and a part of the second connecting section that are connected to the first radiant section constitute a half-wave radiator together with the first radiant section, that is, an overall structure of the half-wave radiator is a non-linear shape, but two ends of a straight line have a bent structure.

In a possible implementation, the first connecting section includes a first cabling that extends reciprocally in a third direction, the first cabling is configured to form radiation-free inductive loading, so as to reduce a size of the folded antenna, and the third direction forms an angle with the second direction. In this application, a vertical spacing between the first radiant section and the second radiant section is opened by disposing the first cabling. In addition, a horizontal length of each of the first radiant section and the second radiant section is reduced, in this case, the horizontal length and the vertical spacing are balanced, and a miniaturized design is implemented.

In a possible implementation, an accommodating space is formed between the first radiant section and the second radiant section, and an extension path of the first cabling is located in the accommodating space. The first cabling occupies the accommodating space between the first radiant section and the second radiant section, and this architecture helps to reduce a space occupied by the antenna.

There are a plurality of periods in which the first cabling extends reciprocally. A connecting line between an endpoint of the first radiant section and an endpoint of the second radiant section is a reference position set for the first connecting section and the second connecting section, the first cabling extends from the reference position into the accommodating space, and one period in which the first cabling extends may be understood as one reciprocal path that extends from the reference position into the accommodating space, and then returns to the reference position. There may be one, two, or more periods in which the first cabling extends reciprocally. The first cabling forms a distributed inductor, which has an inductance load function in the folded antenna. Compared with a linear structure, the first cabling has a higher inductive value, so that the size of the folded antenna can be reduced compared with the linear structure. When a quantity of periods in which a first cabling extends is different, a distributed inductor changes. A larger quantity of periods indicates that more straight line parts (this straight line part refers to an architecture directly connected between the endpoint of the first radiant section and that of the second radiant section) can be replaced, and the first cabling has a function of tuning a bandwidth of the folded antenna, thereby helping the folded antenna to achieve good resonance radiation and protect radiation performance of the folded antenna in a small size.

The extension path of the first cabling may be regular or irregular. Certainly, a regular path design helps to tune a bandwidth of the antenna.

In a possible implementation, the extension path of the first cabling is serpentine, sawtooth, or wavy.

In a possible implementation, the first cabling includes a plurality of first lines that are parallel to each other, and adjacent first lines are connected to each other by using a second line, so as to form the first cabling that continuously extends. An extension direction of the first line may be parallel to the first radiant section, or may form an angle with the first radiant section. In other words, the extension direction of the first line may be the first direction, or may form an angle with respect to the first direction, and the second line may be parallel to the second direction, or may form an angle with respect to the second direction.

In a possible implementation, the first connecting section further includes a third line and a fourth line that are symmetrically distributed on two sides of the first cabling, the first cabling is connected to the first radiant section by using the third line, and the first cabling is connected to the second radiant section by using the fourth line. In this implementation, the first cabling further includes the third line and the fourth line on the two sides, the third line may be used as an extension of the first radiant section, and participates in radiation of the first radiant section. Likewise, the fourth line may be used as an extension of the second radiant section, and participates in radiation of the second radiant section. In this case, the folded antenna may form a small-size architecture.

In a possible implementation, both an extension direction of the third line and that of the fourth line are the second direction, that is, the third line is vertically connected to the first radiant section, and the fourth line is vertically connected to the second radiant section. In another implementation, a connection relationship of an acute angle or a blunt angle between the third line and the first radiant section may alternatively be formed. Likewise, a connection relationship of an acute angle or a blunt angle between the fourth line and the second radiant section may alternatively be formed.

In a possible implementation, the second connecting section includes a fifth line, a second cabling, and a sixth line that are sequentially connected between the first radiant section and the second radiant section, the second cabling is an architecture that extends reciprocally in the third direction and is configured to form radiation-free inductive loading, so as to reduce the size of the folded antenna, and the fifth line, the third line, and the first radiant section together form a half-wave radiator.

A center line passes through a midpoint of the first radiant section and extends in the second direction, and the first cabling and the second cabling are symmetrically distributed on both sides of the center line. The first radiant section may be in a linear shape, or may be a strip line extending in another shape, and the first radiant section is symmetrically distributed by using the center line as a center.

In this application, the two primary radiators (that is, the first radiant section and the second radiant section) are properly separated from each other in the second direction in the folded antenna, the architecture of the first cabling and that of the second cabling are introduced into the first connecting section and the second connecting section, and inductive loading is formed to reduce a size, which may implement that the folded antenna has a forward and backward bidirectional radiation characteristic with a wide beam and a high gain.

In a possible implementation, the second radiant section includes a first primary body, a second primary body, and a feeding stub. The first primary body includes a first connecting end and a first feeding end, the first connecting end is connected to the first connecting section, the second primary body includes a second connecting end and a second feeding end, the second connecting end is connected to the second connecting section, the first feeding end and the second feeding end are disposed oppositely to each other and form a gap therebetween, the feeding stub is connected to the first feeding end, the feeding stub forms an enclosure zone with an opening facing the second primary body, at least a part of the second primary body extends into the enclosure zone, the second feeding end is located in the enclosure zone, the feeding stub forms a coplanar waveguide structure with the part of the second primary body in the enclosure zone, a feeding hole is provided in the second primary body, and the feeding hole is used for a first feeder to pass through, so as to feed the folded antenna by electrically connecting the first feeder to the feeding coplanar waveguide structure.

In this application, by introducing a coplanar waveguide structure into a half-wave radiator (that is, the second radiant section) on a feeding side of the folded antenna, a trident-shaped feeding structure is formed. Antenna excitation is implemented in an orthogonal layout manner, that is, a feeder (which may be a radio frequency coaxial line) is perpendicular to a plane on which the folded antenna is located. For example, the folded antenna is in a microstrip form disposed on one surface of a dielectric plate, the feeder passes through a via on the dielectric plate to feed the folded antenna, and an external conductor of the feeder passes through the via and is directly connected to a radiation arm on which the via is located. That is, the feeder passes through the feeding hole on the second primary body, the external conductor of the feeder is connected to the second primary body, and the external conductor may be welded to be fixed and electronically connected to the second primary body. An inner conductor and an insulating medium of the feeder pass through the feeding hole and bend, and the inner conductor is electrically connected to the first primary body. Likewise, the inner conductor may be welded to be fixed and electrically connected to the first primary body. The insulating medium has a function of isolating the inner conductor from the second primary body to reduce a risk of a short circuit.

In a possible implementation, the dipole antenna includes a high-frequency radiating element and a low-frequency radiating element, and both a main radiation part of the high-frequency radiating element and that of the low-frequency radiating element extend in the second direction. The dipole antenna is disposed in a rectangular shape, and a long side of the rectangular shape is in the second direction. The coupling structure is connected to the low-frequency radiating element, an operating frequency of the low-frequency radiating element is the second frequency band, operating frequencies of the high-frequency radiating element are a third frequency band and a fourth frequency band, the fourth frequency band is higher than the third frequency band, and the third frequency band is higher than the second frequency band. The high-frequency radiating element has a relatively wide frequency band range, for example, 5.1 GHz to 7 GHz. In a specific application scenario, some of the frequency bands may be selected as one operating frequency band based on requirements of different application scenarios, so that the high-frequency radiating element can execute the third frequency band and the fourth frequency band that have different radiation functions. In this way, the dipole antenna forms a three-band vertical polarization antenna architecture, and three frequency bands are respectively: the second frequency band 2.4 GHz to 2.5 GHz, the third frequency band 5.1 GHz to 5.9 GHz, and the fourth frequency band Sub7G: 6 to 7 GHz.

The dipole antenna includes a feeding port, and the folded antenna also includes a feeding port, and the polarization of the dipole antenna is orthogonal to the polarization of the folded antenna. The antenna provided in this application is a four-band dual-polarization double-fed antenna architecture.

In a possible implementation, the low-frequency radiating element is an axisymmetric structure, a symmetric axis of the low-frequency radiating element is a central axis, and there are two coupling structures, which are respectively on two sides of the central axis. Specifically, an extension direction of the central axis is the second direction. The central axis is collinear with a center line of a symmetric center of the first radiant section in the folded antenna.

In a possible implementation, the high-frequency radiating element is symmetrically distributed on two sides of the low-frequency radiating element, the central axis is also a symmetric axis of the high-frequency radiating element, the primary radiator of the folded antenna includes a first radiant section and a second radiant section that are oppositely disposed at an interval, and the folded antenna further includes a first connecting section and a second connecting section that are connected between the first radiant section and the second radiant section and that constitute a ring-shaped architecture together with the first radiant section and the second radiant section. In the second frequency band, the first connecting section and the second connecting section participate in radiation of the low-frequency radiating element, and in the second direction, the high-frequency radiating element faces the first connecting section and the second connecting section.

In a possible implementation, the low-frequency radiating element includes a low-frequency upper radiator and a low-frequency lower radiator, and the high-frequency radiating element includes a high-frequency upper radiator and a high-frequency lower radiator. The high-frequency upper radiator is distributed on two sides of the low-frequency upper radiator, and the high-frequency lower radiator is distributed on two sides of the low-frequency lower radiator. The high-frequency lower radiator and the low-frequency lower radiator form a lower stub, and the high-frequency upper radiator and the low-frequency upper radiator form an upper stub. The upper stub is located between the folded antenna and the lower stub, and a gap is formed between the upper stub and the lower stub. The feeding port of the dipole antenna is located between the upper stub and the lower stub, and is located on the central axis of the low-frequency radiating element. Specifically, the high-frequency radiating element is distributed on the two sides of the low-frequency radiating element to minimize impact between the low-frequency radiating element and the high-frequency radiating element. Because a size of a radiation arm of the low-frequency radiating element needs to be large, the low-frequency radiating element is connected to the folded antenna by using the coupling structure, and a part of the folded antenna participates in the radiation of the low-frequency radiating element for a miniaturized design, that is, the part of the folded antenna and the low-frequency radiating element together complete radiation work of the second frequency band.

The low-frequency upper radiator includes two transmission lines that are disposed in parallel and both extend in the second direction. The two transmission lines are symmetrically distributed on two sides of the central axis of the low-frequency radiating element, ends of the two transmission lines that are close to the folded antenna are connected to the second coupling line of the coupling structure, ends of the two transmission lines that are away from the folded antenna are connected by using an upper connecting line, and the upper connecting line extends in the first direction, that is, the upper connecting line is vertically connected to the two transmission lines.

In a possible implementation, the low-frequency lower radiator includes two transmission lines that are disposed in parallel and extend in the second direction, and the two transmission lines of the low-frequency lower radiator are symmetrically distributed on two sides of the central axis of the low-frequency radiating element. The two transmission lines of the low-frequency lower radiator and the two transmission lines of the low-frequency upper radiator may be collinear in a one-to-one correspondence manner in the second direction. For the low-frequency radiating element, a size in the first direction is a width of a transmission line of the low-frequency radiating element. In this implementation, a width of the transmission line of the low-frequency lower radiator may be the same as a width of the transmission line of the low-frequency upper radiator, and the width of the transmission line of the low-frequency lower radiator may alternatively be greater than the width of the transmission line of the low-frequency upper radiator. Ends of the two transmission lines of the low-frequency lower radiator that are close to the upper stub are connected by using a lower connecting line. The lower connecting line extends in the first direction, the lower connecting line is vertically connected to the two transmission lines of the low-frequency lower radiator, the lower connecting line is parallel to the upper connecting line, and a gap is formed between the upper connecting line and the lower connecting line. The feeding port of the dipole antenna is located between the upper connecting line and the lower connecting line, and is located on the central axis of the low-frequency radiating element.

In another possible implementation, the low-frequency lower radiator may be an integrated structure, that is, the low-frequency lower radiator includes a relatively wide radiant stub, which is equivalent to an integrated architecture in which the two transmission lines in the foregoing implementation are interconnected. In this implementation, the low-frequency lower radiator may alternatively be a symmetric architecture with the central axis of the low-frequency radiating element as a symmetric center, for example, the low-frequency lower radiator is in a rectangular shape.

For the low-frequency lower radiator, regardless of an architecture in which the two transmission lines are disposed in parallel or the integrated architecture with a relatively wide radiant stub, an extension stub that bends and extends may be disposed at one end of the low-frequency lower radiator that is away from the low-frequency upper radiator. Extension stubs of the low-frequency lower radiator are disposed in pairs on two sides of the central axis of the low-frequency radiating element, and the extension stubs are distributed on two sides of the architecture in which the two transmission lines are disposed in parallel or on two sides of the integrated architecture with a relatively wide radiant stub. The extension stub is configured to improve a physical size of the antenna, so that an overall size of the antenna can be reduced on the premise that a resonance frequency is met, which facilitates the miniaturized design of the antenna.

The high-frequency radiating element includes the high-frequency upper radiator and the high-frequency lower radiator. In a possible implementation, the high-frequency upper radiator includes two transmission lines that both extend in the second direction, and the two transmission lines are symmetrically distributed on two sides of the low-frequency upper radiator. In addition, ends of the transmission lines of the high-frequency upper radiator that are close to the folded antenna respectively face the first connecting section and the second connecting section of the folded antenna, and ends of the transmission lines of the high-frequency upper radiator that are away from the folded antenna are connected by using the upper connecting line. The upper connecting line is vertically connected to all of the two transmission lines of the high-frequency upper radiator and the two transmission lines of the low-frequency upper radiator.

In a possible implementation, the high-frequency lower radiator includes two transmission lines that are disposed in parallel and extend in the second direction, and the two transmission lines of the high-frequency lower radiator are symmetrically distributed on two sides of the low-frequency lower radiator. The two transmission lines of the high-frequency lower radiator and the two transmission lines of the high-frequency upper radiator may be collinear in a one-to-one correspondence manner in the second direction. Ends of the two transmission lines of the high-frequency lower radiator that are close to the upper stub are connected by using the lower connecting line, and the lower connecting line is connected to all of endpoints of the two transmission lines of the high-frequency lower radiator and one end of the low-frequency lower radiator in the first direction.

The extension stub of the low-frequency lower radiator is located on one side of the high-frequency lower radiator that is away from the upper stub. That is, the extension stub of the low-frequency lower radiator occupies an idle space on one side of the high-frequency lower radiator that is away from the upper stub, a physical size of the low-frequency lower radiator is changed without changing the overall size of the antenna, which facilitates setting of the miniaturized antenna.

Specifically, the dipole antenna has a high-frequency characteristic and a low-frequency characteristic. By making polarization of the high-frequency radiating element and the low-frequency radiating element orthogonal to the polarization of the folded antenna, the polarization of the dipole antenna is orthogonal to the polarization of the folded antenna, thereby reducing impact between the dipole antenna and the folded antenna in different operating frequency bands.

According to a second aspect, this application provides an antenna module, including a first feeder, a second feeder, and any one of the foregoing antennas. The first feeder is electrically connected to the folded antenna, and the second feeder is electrically connected to the dipole antenna. The folded antenna is excited by using the first feeder to generate horizontal polarization, and the dipole antenna is excited by using the second feeder to generate vertical polarization, thereby forming a four-band dual-polarization antenna.

In a possible implementation, the antenna is located on a first plane, the first feeder is perpendicular to the first plane, and the second feeder is parallel to the first plane. A current passes through the first feeder and the second feeder, which inevitably causes electromagnetic fields around the feeders. A selection of an orthogonal design makes induction fields around the first feeder and the second feeder be orthogonal, so that impact between the induction fields is the least, and transmission efficiency is the highest.

Specifically, the antenna is a microstrip structure disposed on a dielectric plate. The first feeder includes a first external conductor, a first inner conductor, and a first dielectric insulation part. The first feeder passes through a via on the dielectric plate, the first outer conductor is electrically connected to a second primary body of a second radiant section of the folded antenna, the first dielectric insulation part and the first inner conductor pass through the via on the dielectric plate and bend, the first inner conductor is electrically connected to a first primary body of the second radiant section of the folded antenna, that is, a first feeding point and a second feeding point are respectively disposed on the first primary body and the second primary body, the first external conductor of the first feeder is welded to be fixed and electrically connected to the second feeding point, the first inner conductor of the first feeder bends, extends, and is welded to fixed and electrically connected to the first feeding point of the first primary body, and the first dielectric insulation part encloses the first inner conductor, so as to ensure insulation isolation between the first inner conductor and the second primary body.

The second feeder includes a second external conductor, a second inner conductor, and a second dielectric insulation part. The second external conductor and the second inner conductor are attached to the first plane, the second external conductor is connected to a third feeding point of the dipole antenna, the second dielectric insulation part leads out from the third feeding point, the second inner conductor is connected to a fourth feeding point of the dipole antenna, and the second dielectric insulation part encloses the second inner conductor, so as to ensure insulation isolation between the second inner conductor and the radiator in which the third feeding point is located. Specifically, the third feeding point and the fourth feeding point are respectively disposed in a lower stub and an upper stub of the dipole antenna, a gap is disposed between the upper stub and the lower stub, the upper stub is located between the folded antenna and the lower stub, and the third feeding point and the fourth feeding point are located on a central axis of the dipole antenna.

According to a third aspect, this application provides a wireless network device, including a feeding network and any one of the foregoing antenna modules, where the feeding network is connected to a first feeder and a second feeder of the antenna module to implement excitation on a folded antenna and a dipole antenna.

DETAILED DESCRIPTION OF ILLUSTRATIVE EMBODIMENTS

The following describes embodiments of this application with reference to the accompanying drawings.

Figure 1:
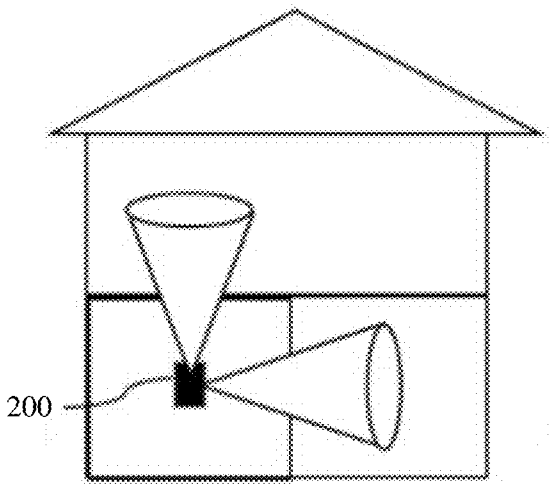
FIG. 1 is an application scenario diagram of a wireless network device according to an implementation of this application.

With development of a communication technology, a wireless communication transmission requirement of a home scenario also increases. As shown in FIG. 1, this application provides a wireless network device 200. The wireless network device 200 may be a Wi-Fi product, and an antenna (not shown in the figure) disposed inside the wireless network device 200 has a good horizontal omnidirectional characteristic and vertical directional characteristic, and can conform to wireless communication requirements in different home scenarios. Usually, house types of most common families are single-floor house types, and a coverage requirement of such house type for home wireless communication is concentrated in a horizontal omnidirectional function, that is, different rooms in the house type of a same floor can be covered by the wireless network device 200. However, for some families with duplex or villa house types, a vertical coverage function of a wireless network needs to be further met, so as to implement wireless communication on different floors, in this case, energy concentration of the wireless network device 200 needs to be good, and the wireless network device 200 needs to have a vertical directional characteristic.

Figure 2:
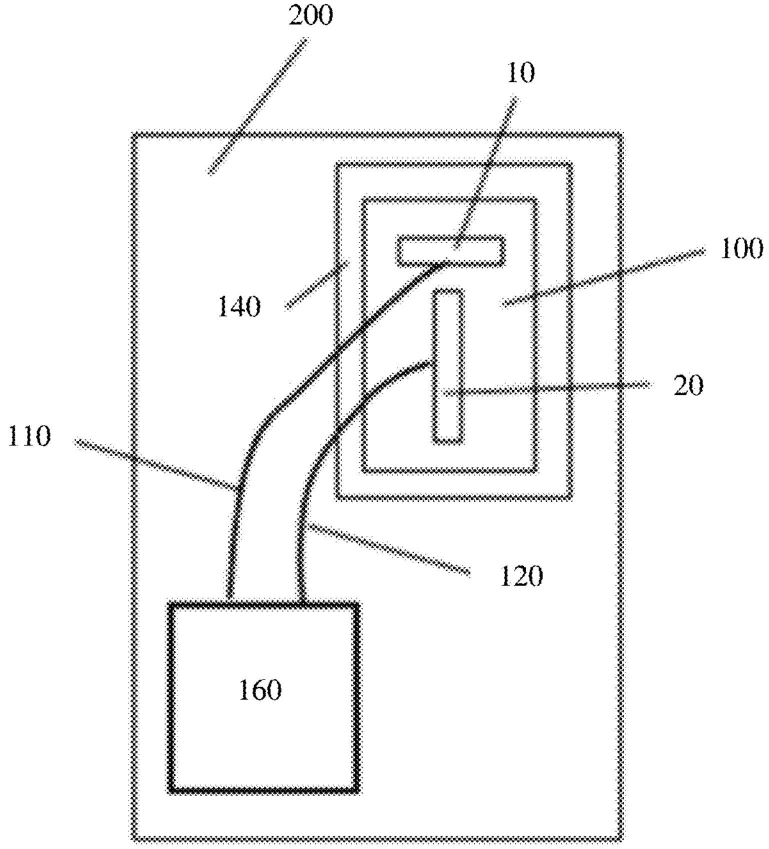
FIG. 2 is a schematic diagram of an antenna module according to an implementation of this application.

In a specific embodiment, as shown in FIG. 2, an antenna module in the wireless network device 200 includes an antenna 100 disposed on a base board 140, a first feeder no, a second feeder 120, and a feeding network 160 that are configured to excite the antenna 100. In this embodiment, the antenna 100 includes a folded antenna 10 and a dipole antenna 20. When a signal of the feeding network 160 is input, the folded antenna 10 and the dipole antenna 20 are excited, so as to obtain resonance modes of the folded antenna 10 and the dipole antenna 20 in different frequencies, and implement vertical directional radiation of the folded antenna 10 and horizontal omnidirectional radiation of the dipole antenna 20, thereby ensuring horizontal omnidirectional and vertical directional functions of the wireless network device 200 in different frequency bands.

Figure 3:
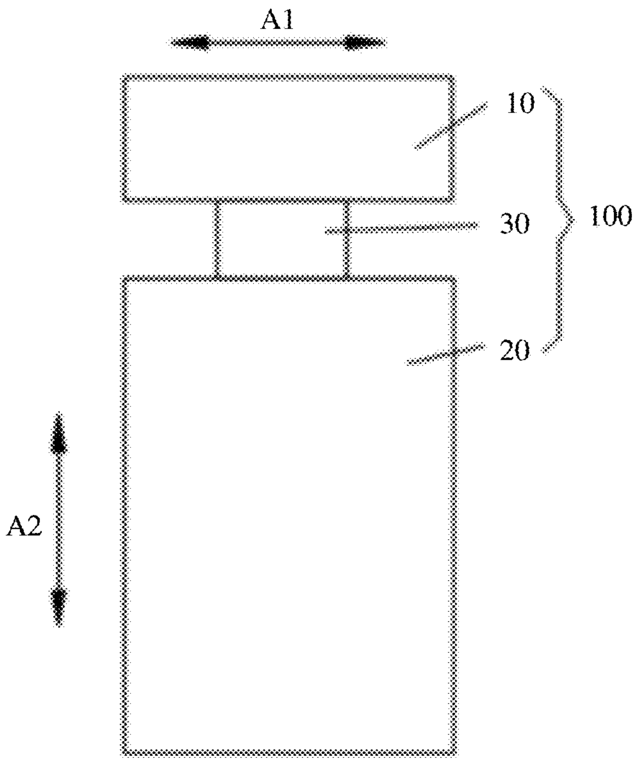
FIG. 3 is a schematic diagram of an antenna according to an implementation of this application.

Referring to FIG. 3, the antenna 100 provided in this application includes the folded antenna 10, the dipole antenna 20, and a coupling structure 30.

The folded antenna is also referred to as a folded dipole antenna, including two primary radiators. In the primary radiator, usually a half-wavelength main dipole and a half-wavelength parasitic dipole are close to each other, and the primary radiators are connected to each other by a using a connecting section. A standing wave current and a standing wave voltage induced by the parasitic dipole and a standing wave current and a standing wave voltage induced by the main dipole have same distribution, and a phase delay may be ignored because a distance is close, coupling is tight, and sizes are the same. The main dipole and the parasitic dipole are close to each other, so that the connecting section therebetween is very short, and hardly participates in radiation.

An extension direction of the primary radiator of the folded antenna 10 is a first direction A1, an extension direction of the primary radiator of the dipole antenna 20 is a second direction A2, and the first direction A1 is orthogonal to the second direction A2. In the second direction A2, the folded antenna 10 is disposed at one end of the dipole antenna 20, an operating frequency of the folded antenna 10 is a first frequency band, an operating frequency of the dipole antenna 20 includes a second frequency band (the dipole antenna 20 may be a multi-band antenna, for example, a three-band antenna, which may be described later), the first frequency band is higher than the second frequency band, and the coupling structure 30 is connected between the folded antenna 10 and the dipole antenna 20. In the second frequency band, the coupling structure 30 generates resonance, so that the folded antenna 10 participates in radiation of the dipole antenna 20, and in the first frequency band, the coupling structure 30 has an isolation function.

A definition of each of the first direction A1 and the second direction A2 may be understood as follows: As shown in FIG. 3, indicator lines with arrows at both ends are marked as the first direction A1 and the second direction A2, which refer to an extension direction of a straight line, and does not limit a specific end to which the straight line extends. For example, the first direction A1 may be understood as extending leftward along the straight line, or may be understood as extending rightward along the straight line, provided that the first direction A1 is in the straight line.

In this application, the folded antenna 10 and the dipole antenna 20 are integrated together by using the coupling structure 30. By using an isolation effect in the first frequency band and a straight-through effect in the second frequency band of the coupling structure 30, the folded antenna 10 may not only execute an operating frequency band of itself, but also participate in the radiation of the dipole antenna 20 in the second frequency band, radiators of the folded antenna 10 may participate in radiation of different antennas, and are independent of each other in performance. By disposing the extension direction of the primary radiator of the folded antenna 10 as the first direction A1, the extension direction of the primary radiator of the dipole antenna 20 as the second direction A2, and the first direction A1 to be orthogonal to the second direction A2, polarization of the folded antenna 10 is orthogonal to polarization of the dipole antenna 20, thereby implementing high isolation polarization separation and space diversity between the folded antenna 10 and the dipole antenna 20. The antenna 100 provided in this application has advantages of a small size and good radiation performance.

Figure 4:
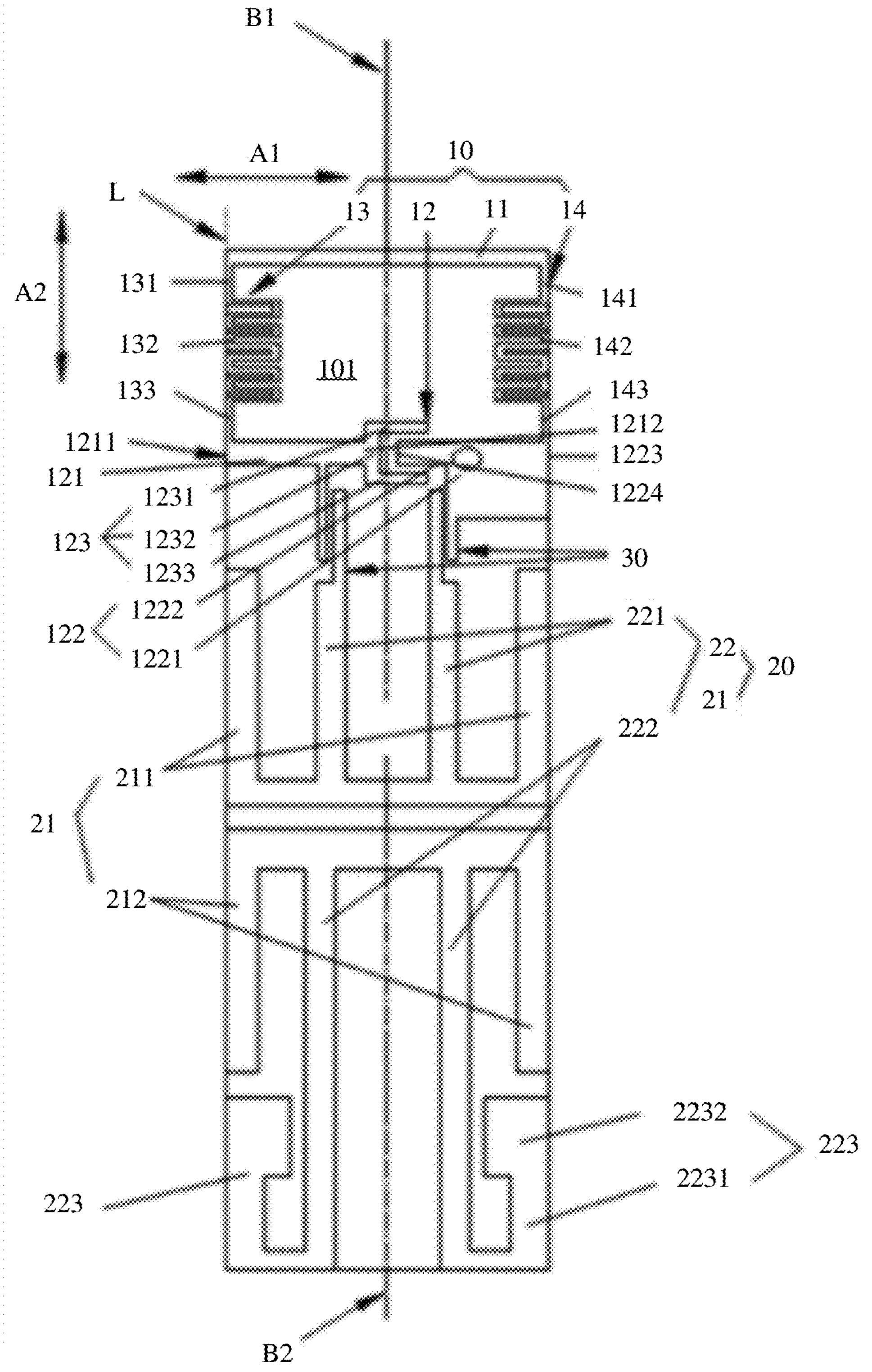
FIG. 4 is a schematic diagram of an antenna according to an implementation of this application.

Referring to FIG. 4, the primary radiator of the folded antenna 10 includes a first radiant section 11 and a second radiant section 12 that are oppositely disposed at an interval, and the folded antenna 10 further includes a first connecting section 13 and a second connecting section 14 that are connected between the first radiant section 11 and the second radiant section 12 and that constitute a ring-shaped architecture together with the first radiant section 11 and the second radiant section 12. As shown in FIG. 4, the folded antenna 10 is a rectangular architecture as a whole, and the first radiant section 11 and the second radiant section 12 constitute long sides. The dipole antenna 20 is also a rectangular architecture as a whole, but a long side direction of the dipole antenna 20 is the second direction A2, and is perpendicular to a long side direction of the folded antenna 10. The first connecting section 13 and the second connecting section 14 extend in the long side direction of the dipole antenna 20, and in the second frequency band, the first connecting section 13 and the second connecting section 14 are configured to participate in the radiation of the dipole antenna 20. For the folded antenna 10, an extension direction of the first radiant section 11 and that of the second radiant section 12 are the first direction A1, and the first radiant section 11 and the second radiant section 12 are the primary radiators of the folded antenna 10. In an operating state, current distribution of the first radiant section 11 and that of the second radiant section 12 are in a same direction, and the first connecting section 13 and the second connecting section 14 are connected between the first radiant section 11 and the second radiant section 12, so as to implement in-phase superposition of radiation energy of the first radiant section 11 and that of the second radiant section 12.

In this application, the folded antenna 10 is an improved design based on a conventional folded antenna, a limitation that two radiators of the conventional folded antenna are close to each other is broken through, a horizontal length and a vertical spacing are balanced, and a miniaturized design may be implemented. To design a miniaturized antenna, on the premise that radiation performance of the folded antenna 10 is not effected, in the first direction A1, a size of the first radiant section 11 and that of the second radiant section 12 are designed from λh/4 to λh/3, in the second direction A2, a size of the first connecting section 13 and that of the second connecting section 14 are designed from λh/10 to λh/2, and λh is a resonance wavelength of the folded antenna 10. In this application, on a basis of the conventional folded antenna 10, a horizontal length is reduced, and a gap between the first radiant section 11 and the second radiant section 12 is opened, so that there is a space difference therebetween, thereby implementing a binary array effect. In the folded antenna 10 provided in this application, the first radiant section 11, a part of the first connecting section 13, and a part of the second connecting section 14 together constitute a continuously extending half-wave radiator, that is, an overall structure of the half-wave radiator is a nonlinear shape, but two ends of the straight line have a bent structure.

Figure 5:
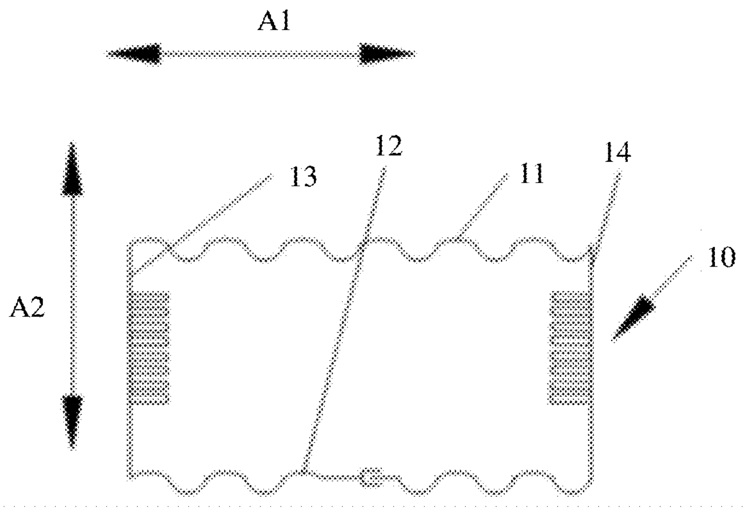
FIG. 5 is a schematic diagram of a folded antenna in an antenna according to an implementation of this application.

A limitation that the extension direction of the first radiant section 11 is the first direction A1 may be understood as that an extension trend of the first radiant section 11 is the first direction A1, and may be understood as that when the first radiant section 11 is only a linear structure, the extension direction of the first radiant section 11 is only the first direction A1, and there is no stub that deviates from the first direction A1. In this application, the first radiant section 11 is not limited to be a linear shape, the first radiant section 11 may alternatively be a nonlinear shape, or a short stub is added based on a linear shape, and the short stub does not affect the extension trend of the first radiant section 11. The first radiant section 11 may alternatively deform based on a linear transmission line, for example, FIG. 5 briefly shows an architecture of the folded antenna 10. The first radiant section 11 and the second radiant section 12 are designed to have a regular or irregular wavy transmission line extension structure, and that a wavy transmission line extension trend is the first direction A1 may be understood as that a direction from one end of the wavy transmission line to the other end of the wavy transmission line is the first direction A1. When the wavy line is viewed as a relatively wide rectangular transmission structure, an overall extension trend is a long side direction of the rectangle, that is, the first direction A1.

Figure 11:
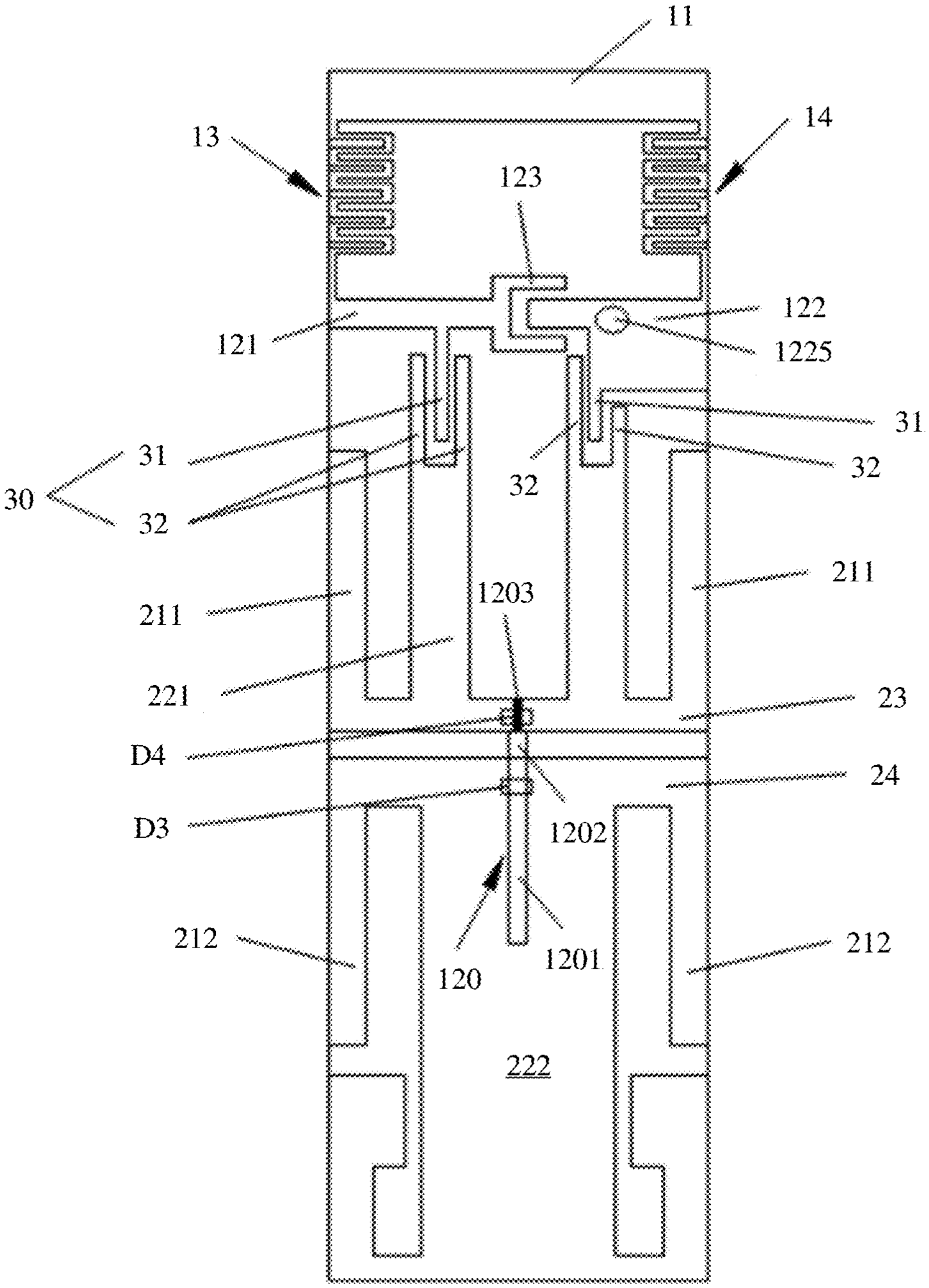
FIG. 11 is a schematic diagram of an antenna according to an implementation of this application, which includes a feeding structure of a dipole antenna.

In this application, a radiation capability of the folded antenna 10 may be enhanced by increasing a width of the first radiant section 11 (that is, a size of the first radiant section 11 in the second direction), for example, a width of the first radiant section 11 in an embodiment shown in FIG. 11 is greater than a width of the first radiant section 11 in embodiments shown in each of FIG. 4 and FIG. 7 to FIG. 9.

Figure 6:
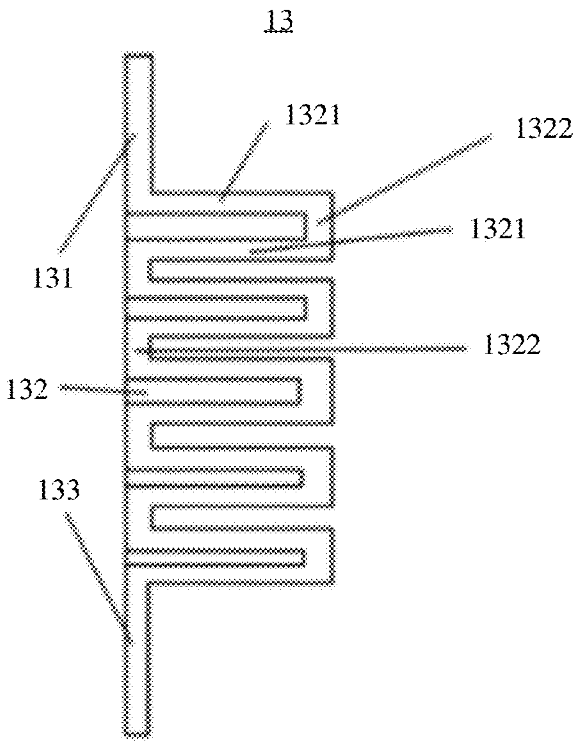
FIG. 6 is an enlarged schematic diagram of a third connecting section in a folded antenna of an antenna according to an implementation of this application.

Referring to FIG. 4 and FIG. 6, the first connecting section 13 includes a third line 131, a first cabling 132, and a fourth line 133 that are sequentially connected. The first cabling 132 extends reciprocally in a third direction (the third direction is not indicated in FIG. 4, in this implementation, the third direction is the same as the first direction A1, and in another implementation, the third direction may alternatively form an angle with the first direction A1), and the first cabling 132 is configured to form radiation-free inductive loading, so as to reduce a size of the folded antenna 10, and the third direction forms an angle with the second direction A2. The second connecting section 14 includes a fifth line 141, a second cabling 142, and a sixth line 143 that are sequentially connected between the first radiant section 11 and the second radiant section 12, the second cabling 142 is an architecture that extends reciprocally in the third direction and is configured to form radiation-free inductive loading, so as to reduce the size of the folded antenna 10, and the fifth line 141, the third line 131, and the first radiant section 11 together form a half-wave radiator. In this application, a vertical spacing between the first radiant section 11 and the second radiant section 12 is opened by disposing the first cabling 132 and the second cabling 142. In addition, a length (that is, a horizontal length) of the first radiant section 11 in the first direction A1 is reduced, in this case, the horizontal length and the vertical spacing are balanced, and a miniaturized design of the folded antenna 10 is implemented.

Then, a specific structure of the first cabling 132 is mainly described in detail. A specific structure of the second cabling 142 may be the same as that of the first cabling 132, and details are not described.

An accommodating space 101 is formed between the first radiant section 11 and the second radiant section 12, and paths in which the first cabling 132 and the second cabling 142 extend are located in the accommodating space 101. The first cabling 132 occupies the accommodating space 101 between the first radiant section 11 and the second radiant section 12, and this architecture helps to reduce a space occupied by the antenna 100. The first cabling 132 is correspondingly disposed in an edge area of one end of the first radiant section 11, and the second cabling 142 is correspondingly disposed in an edge area of the other end of the first radiant section it A size by which the first cabling 132 extends in the first direction A1 is not greater than λh/4, and λh is the resonance wavelength of the folded antenna 10. A spacing is maintained between the second cabling 142 and the first cabling 132, so as to ensure a radiation effect of the folded antenna 10. Currents are mainly concentrated on the first radiant section 11 and the second radiant section 12.

Specifically, referring to FIG. 6, the first cabling 132 includes a plurality of first lines 1321 that are parallel to each other, and adjacent first lines 1321 are connected to each other by using a second line 1322, so as to form the first cabling 132 that continuously extends. An extension direction of the first line 1321 may be parallel to the first radiant section 11, or may form an angle with the first radiant section 11. In other words, the extension direction of the first line 1321 may be the first direction A1, or may form an angle with respect to the first direction A1, and the second line 1322 may be parallel to the second direction A2, or may form an angle with respect to the second direction A2.

There are a plurality of periods in which the first cabling 132 extends reciprocally. A connecting line between an endpoint of the first radiant section 11 and an endpoint of the second radiant section is a reference position set for the first connecting section 13 and the second connecting section 14 (for example, a connecting line position in which a dashed line L is located in FIG. 4), the first cabling 132 extends from the reference position into the accommodating space. One period in which the first cabling 132 extends may be understood as one reciprocal path that extends from the reference position into the accommodating space, and then returns to the reference position. There may be one, two, or more periods in which the first cabling 132 extends reciprocally. The first cabling 132 forms a distributed inductor, which has an inductance load function in the folded antenna 10. Compared with a linear structure, the first cabling 132 has a higher inductive value, so that the size of the folded antenna 10 can be reduced compared with the linear structure. When a quantity of periods in which a first straight line extends is different, a distributed inductor changes. A larger quantity of periods indicates that more straight line pails (this straight line part refers to an architecture directly connected between the endpoint of the first radiant section 11 and that of the second radiant section 12) can be replaced, thereby helping the folded antenna 10 to achieve good resonance radiation and protect radiation performance of the folded antenna 10 in a small size.

The extension path of the first cabling 132 may be regular or irregular. Certainly, a regular path design helps to tune a bandwidth of the antenna. The extension path of the first cabling 132 may be serpentine, sawtooth, or wavy.

The third line 131 and the fourth line 133 are symmetrically distributed on two sides of the first cabling 132, the first cabling 132 is connected to the first radiant section 11 by using the third line 131, and the first cabling 132 is connected to the second radiant section 12 by using the fourth line 133. In this implementation, the third line 131 may be used as an extension of the first radiant section 11, and participates in radiation of the first radiant section 11. Likewise, the fourth line 133 may be used as an extension of the second radiant section 12, and participates in radiation of the second radiant section 12. In this way, the folded antenna 10 may form a small-size architecture.

In a possible implementation, both an extension direction of the third line 131 and that of the fourth line 133 are the second direction, that is, the third line 131 is vertically connected to the first radiant section 11, and the fourth line 133 is vertically connected to the second radiant section 12. In another implementation, a connection relationship of an acute angle or a blunt angle between the third line 131 and the first radiant section 11 may alternatively be formed. Likewise, a connection relationship of an acute angle or a blunt angle between the fourth line 133 and the second radiant section 12 may alternatively be formed.

Figure 7:
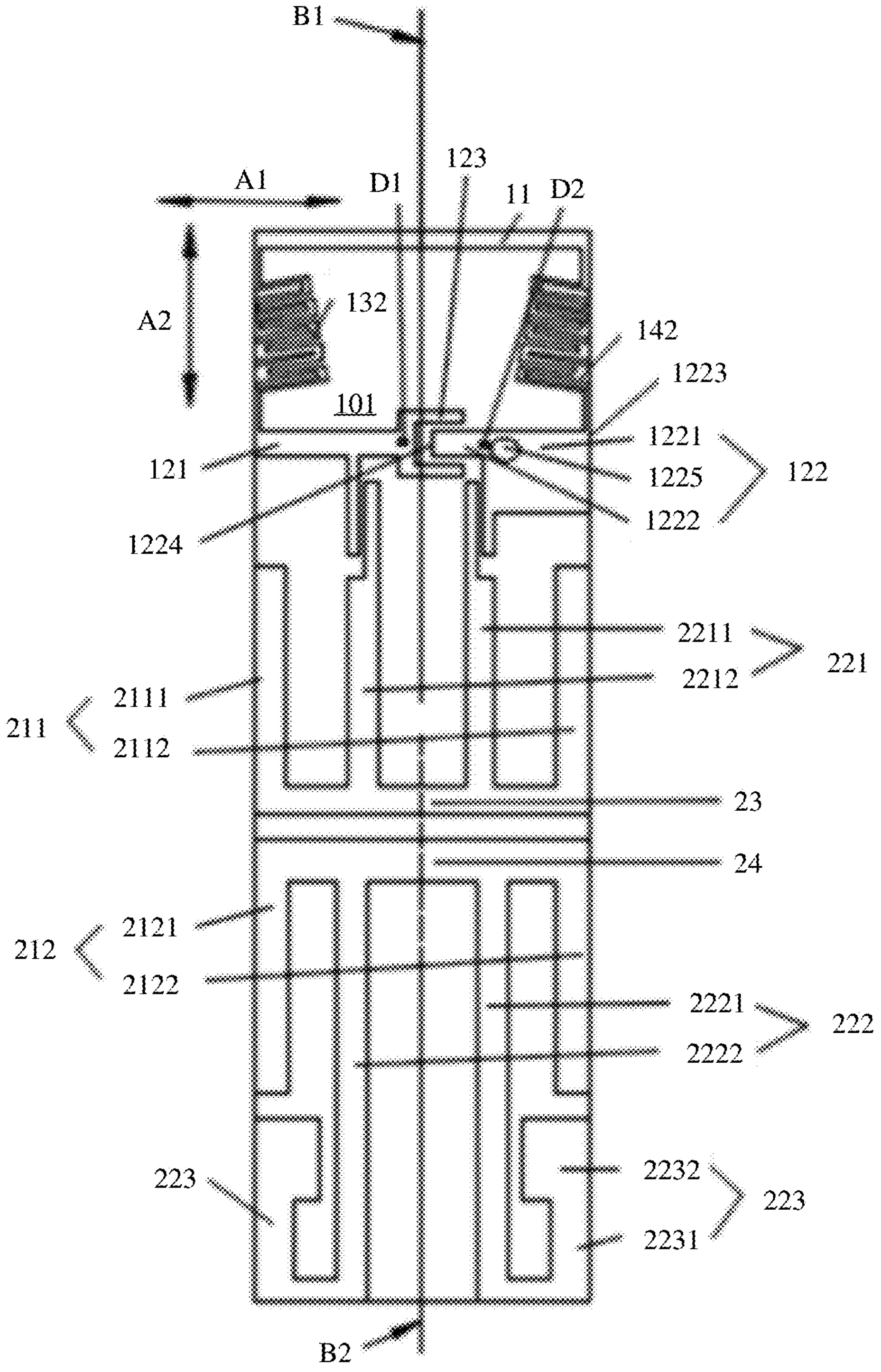
FIG. 7 is a schematic diagram of an antenna according to an implementation of this application.

A center line B1 (as shown in FIG. 4) passes through a midpoint of the first radiant section 11 and extends in the second direction, and the first cabling 132 and the second cabling 142 are symmetrically distributed on both sides of the center line B1. In an implementation shown in FIG. 4, an extension direction of the first cabling 132 and that of the second cabling 142 are same and are the first direction A1. In another implementation, as shown in FIG. 7, both the extension direction of the first cabling 132 and that of the second cabling 142 form an angle with the first direction A1, and the extension direction of the first cabling 132 and that of the second cabling 142 are symmetrically distributed on two sides of the center line B1.

When the first radiant section 11 is a strip line (for example, a wavy line) extending in another shape, the first radiant section 11 is also symmetrically distributed around the center line B1, so as to ensure a radiation direction of the folded antenna 10.

In this application, the two primary radiators (that is, the first radiant section 11 and the second radiant section 12) of the folded antenna 10 are properly separated from each other in the second direction, a size of the first radiant section 11 and that of the second radiant section 12 in the first direction A1 are designed to be less than a half of a wavelength. The first radiant section 11, a part of the first connecting section 13, and a part of the second connecting section 14 together construct a half-wave radiator, to form a bent current path at an end of the first radiant section 11, and a size of the folded antenna 10 in the first direction A1 can be reduced. By introducing an architecture of the first cabling 132 and that of the second cabling 142 into the first connecting section 13 and the second connecting section 14, and inductive loading is formed to reduce a size, which may implement that the folded antenna 10 has a forward and backward bidirectional radiation characteristic with a wide beam and a high gain.

A feeding port of the folded antenna 10 is disposed on the second radiant section 12. The second radiant section 12 includes a first primary body 121, a second primary body 122, and a feeding stub 123. The first primary body 121 is a linear transmission line and extends in the first direction A1, the first primary body 121 includes a first connecting end 1211 and a first feeding end 1212, and the first connecting end 1211 is connected to the first connecting section 13. The second primary body 122 includes a second connecting end 1223 and a second feeding end 1224, and the second connecting end 1223 is connected to the second connecting section 14. The first feeding end 1212 is disposed oppositely to the second feeding end 1224 and a gap is formed therebetween. Specifically, the gap may be located at the center line B1 of the folded antenna 10, in other words, the center line B1 passes through the gap. The first connecting section 13 and the second connecting section 14 are symmetrically distributed with the center line B1 as a symmetric center, and the midpoint of the first radiant section 11 is also located on the center line B1. The feeding stub 123 is connected to the first feeding end 1212, the feeding stub 123 forms an enclosure zone with an opening facing the second primary body 122, and the feeding stub 123 includes a first stub 1231, a second stub 1232, and a third stub 1233 that are sequentially vertically connected. The first stub 1231 and the third stub 1233 are parallel and opposite to each other, the second stub 1232 is vertically connected between the first stub 1231 and the third stub 1233, and the first feeding end 1212 of the first primary body 121 is connected to a midpoint of the second stub 1232. In another implementation, the feeding stub 123 may alternatively be arc-shaped, for example, C-shaped. At least a part of the second primary body 122 extends into the enclosure zone, the second feeding end 1224 is located in the enclosure zone, and the feeding stub 123 and the part of the second primary body 122 in the enclosure zone constitute a coplanar waveguide structure.

Referring to FIG. 7, a feeding hole 1225 is provided in the second primary body 122, and the feeding hole 1225 is used for a first feeder to pass through, so as to feed the folded antenna 10 by electrically connecting the first feeder to the feeding coplanar waveguide structure. The second primary body 122 includes a first section 1221 and a second section 1222 that are interconnected, and a width of the first section 1221 and that of the second section 1222 are different. A width refers to a size of the second primary body 122 in the second direction A2, and the width of the first section 1221 is greater than the width of the second section 1222. Therefore, the feeding hole 1225 is disposed on the first section 1221, which helps to weld an external conductor of the first feeder to the first section 1221 after the first feeder passes through the feeding hole 1225. The first section 1221 is connected between the second section 1222 and the second connecting section 14, and the second connecting end 1223 is a connection position between the first section 1221 and the second connecting section 14. The second feeding end 1224 is an end of the second section 1222 that faces the first primary body 121. The second feeding end 1224 is located in the enclosure zone of the feeding stub 123. The feeding hole 1225 is in a position of the first section 1221 that is adjacent to the second section 1222. An edge of the first section 1221 that faces the first radiant section 11 and an edge of the second section 1222 that faces the first radiant section 11 are collinear.

In this application, by introducing a coplanar waveguide structure into a half-wave radiator (that is, the second radiant section 12) on a feeding side of the folded antenna 10, a trident-shaped feeding structure is formed. Antenna excitation is implemented in an orthogonal layout manner, that is, a feeder (which may be a radio frequency coaxial line) is perpendicular to a plane on which the folded antenna 10 is located. For example, the folded antenna 10 is in a microstrip form disposed on one surface of a dielectric plate, the feeder passes through a via on the dielectric plate to feed the folded antenna 10, and an external conductor of the feeder passes through the via and is directly connected to a radiation arm on which the via is located. That is, the feeder passes through the feeding hole 1225 on the second primary body 122, and the external conductor of the feeder is connected to the second primary body 122, which may be fixed in a welding manner and electronically connected. An inner conductor and an insulating medium of the feeder pass through the feeding hole and bend, the inner conductor is electrically connected to the first primary body 121, and the inner conductor may be welded to be fixed and electronically connected to the first primary body 121. The insulating medium has a function of isolating the inner conductor from the second primary body 122 to reduce a risk of a short circuit.

Specifically, a first feeding point D1 and a second feeding point D2 are respectively disposed on the first primary body 121 and the second primary body 122. A first external conductor of the first feeder is welded to be fixed and electrically connected to the second feeding point D2, the first inner conductor of the first feeder bends and extends, and is welded to be fixed and electrically connected to the first feeding point D1 in the first primary body 121, and a first dielectric insulation part encloses the first inner conductor, so as to ensure insulated isolation between the first inner conductor and the second primary body 122.

In a possible implementation, the dipole antenna 20 includes a high-frequency radiating element 21 and a low-frequency radiating element 22, and both a main radiation part of the high-frequency radiating element 21 and that of the low-frequency radiating element 22 extend in the second direction A2. The dipole antenna 20 is disposed in a rectangular shape as a whole, and a long side of the rectangular shape is in the second direction A2. The coupling structure 30 is connected to the low-frequency radiating element 22, an operating frequency of the low-frequency radiating element 22 is the second frequency band, operating frequencies of the high-frequency radiating element 21 are a third frequency band and a fourth frequency band, the fourth frequency band is higher than the third frequency band, and the third frequency band is higher than the second frequency band. The high-frequency radiating element 21 has a relatively wide frequency band range, for example, 5.1 GHz to 7 GHz. In a specific application scenario, some of the frequency bands may be selected as one operating frequency band based on requirements of different application scenarios, and different frequency bands may be selected for feeding based on requirements of different application scenarios, so that the high-frequency radiating element 21 can execute the third frequency band and the fourth frequency band that have different radiation functions. In this way, the dipole antenna 20 forms a three-band vertical polarization antenna architecture, and three frequency bands are respectively: the second frequency band 2.4 GHz to 2.5 GHz, the third frequency band 5.1 GHz to 5.9 GHz, and the fourth frequency band Sub7G: 6 to 7 GHz.

The dipole antenna 20 includes a feeding port, the folded antenna 10 also includes a feeding port, and the polarization of the dipole antenna 20 is orthogonal to the polarization of the folded antenna 10. The antenna provided in this application is a four-band dual-polarization double-fed antenna architecture.

In a possible implementation, the low-frequency radiating element 22 is an axisymmetric structure, and a symmetric axis of the low-frequency radiating element 22 is a central axis B2. There are two coupling structures 30, and they are respectively on two sides of the central axis B2. Specifically, an extension direction of the central axis B2 is the second direction A2. As shown in FIG. 4, the central axis B2 is collinear with the center line B1 of the symmetric center of the first radiant section 11 in the folded antenna 10.

In a possible implementation, the high-frequency radiating element 21 is symmetrically distributed on two sides of the low-frequency radiating element 22, and the central axis B2 is also a symmetric axis of the high-frequency radiating element 21. In the second frequency band, the first connecting section 13 and the second connecting section 14 participate in radiation of the low-frequency radiating element 22, and in the second direction A2, the high-frequency radiating element 21 faces the first connecting section 13 and the second connecting section 14.

Referring to FIG. 4, in a possible implementation, the low-frequency radiating element 22 includes a low-frequency upper radiator 221 and a low-frequency lower radiator 222, and the high-frequency radiating element 21 includes a high-frequency upper radiator 211 and a high-frequency lower radiator 212. The high-frequency upper radiator 211 is distributed on two sides of the low-frequency upper radiator 221, and the high-frequency lower radiator 212 is distributed on two sides of the low-frequency lower radiator 222. The high-frequency lower radiator 212 and the low-frequency lower radiator 222 form a lower stub, and the high-frequency upper radiator 211 and the low-frequency upper radiator 221 form an upper stub. The upper stub is located between the folded antenna 10 and the lower stub, and a gap is formed between the upper stub and the lower stub. The feeding port of the dipole antenna 20 is located between the upper stub and the lower stub, and is located on the central axis of the low-frequency radiating element 22. Specifically, the high-frequency radiating element 21 is distributed on the two sides of the low-frequency radiating element 22 to minimize impact between the low-frequency radiating element 22 and the high-frequency radiating element 21. Because a size of a radiation arm of the low-frequency radiating element 22 needs to be large, the low-frequency radiating element 22 is connected to the folded antenna 10 by using the coupling structure 30, and a part of the folded antenna 10 participates in radiation of the low-frequency radiating element 22 for a miniaturized design, that is, the part of the folded antenna 10 and the low-frequency radiating element 22 together complete radiation work of the second frequency band.

Referring to FIG. 7, the low-frequency upper radiator 221 includes two transmission lines 2211 and 2212 that are disposed in parallel and both extend in the second direction A2. The two transmission lines 2211 and 2212 are symmetrically distributed on two sides of the central axis B2 of the low-frequency radiating element 22, ends of the two transmission lines 2211 and 2212 that are close to the folded antenna 10 are connected to the coupling structure 30, ends of the two transmission lines 2211 and 2212 that are away from the folded antenna 10 are connected by using an upper connecting line 23, and the upper connecting line 23 extends in the first direction A1, that is, the upper connecting line 23 is vertically connected to the two transmission lines 2211 and 2212.

In a possible implementation, the low-frequency lower radiator 222 includes two transmission lines 2221 and 2222 that are disposed in parallel and extend in the second direction A2, and the two transmission lines 2221 and 2222 of the low-frequency lower radiator 222 are symmetrically distributed on the two sides of the central axis B2 of the low-frequency radiating element 22. The two transmission lines 2221 and 2222 of the low-frequency lower radiator 222 and the two transmission lines 2211 and 2212 of the low-frequency upper radiator 221 may be collinear in a one-to-one correspondence manner in the second direction A2. For the low-frequency radiating element 22, a size in the first direction A1 is a width of a transmission line of the low-frequency radiating element 22. In this implementation, a width of each of the transmission lines 2221 and 2222 of the low-frequency lower radiator 222 may be the same as a width of each of the transmission lines 2211 and 2212 of the low-frequency upper radiator 221, and the width of each of the transmission lines 2221 and 2222 of the low-frequency lower radiator 222 may alternatively be greater than the width of each of the transmission lines 2211 and 2212 of the low-frequency upper radiator 221. Ends of the two transmission lines 2221 and 2222 of the low-frequency lower radiator 222 that are close to the upper stub are connected by using a lower connecting line 24. The lower connecting line 24 extends in the first direction A1, the lower connecting line 24 is vertically connected to the two transmission lines 2221 and 2222 of the low-frequency lower radiator 222, the lower connecting line 24 is parallel to the upper connecting line 23, and a gap is formed between the upper connecting line 23 and the lower connecting line 24. The feeding port of the dipole antenna 20 is located between the upper connecting line 23 and the lower connecting line 24, and is located on the central axis B1 of the low-frequency radiating element 22.

Figure 8:
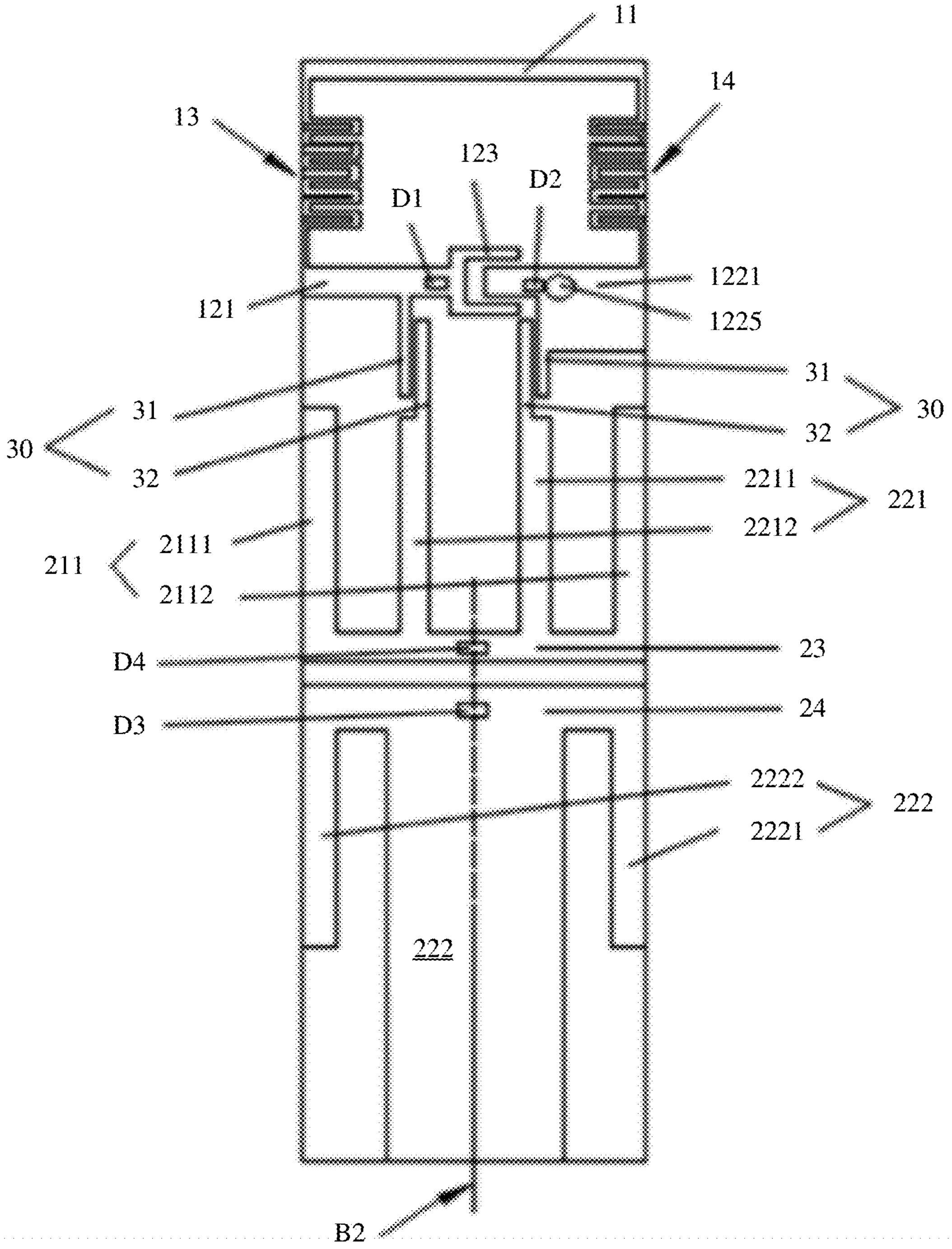
FIG. 8 is a schematic diagram of an antenna according to an implementation of this application.

In another possible implementation, the low-frequency lower radiator 222 may be an integrated structure. As shown in FIG. 8, the low-frequency lower radiator 222 includes a relatively wide radiant stub, which is equivalent to an integrated architecture in which the two transmission lines 2221 and 2222 in the implementation shown in FIG. 4 are interconnected. In this implementation, the low-frequency lower radiator 222 may alternatively be a symmetric architecture with the central axis B2 of the low-frequency radiating element 22 as a symmetric center, for example, the low-frequency lower radiator 222 is in a rectangular shape.

Figure 9:
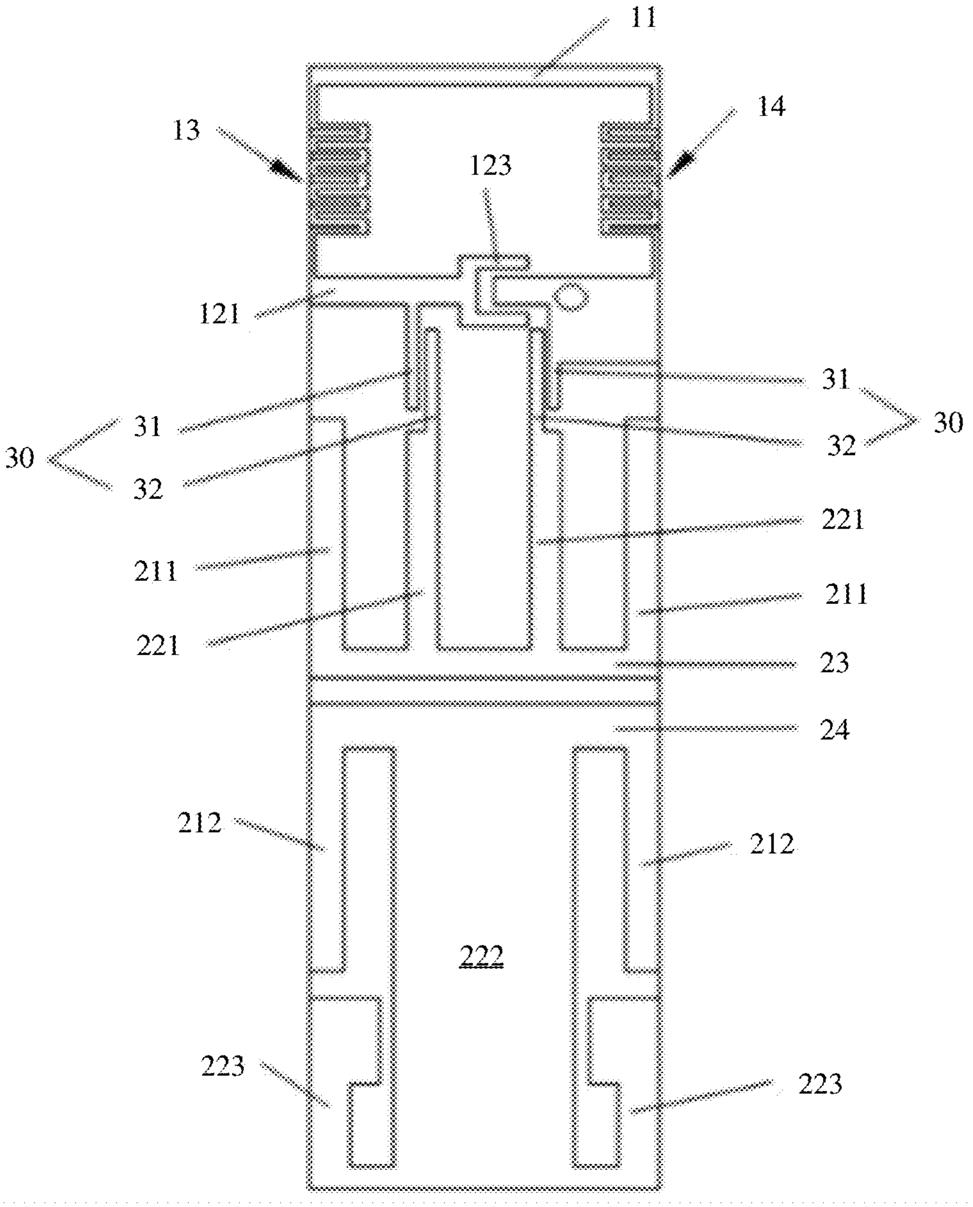
FIG. 9 is a schematic diagram of an antenna according to an implementation of this application.

Referring to FIG. 7 and FIG. 9, for the low-frequency lower radiator 222, regardless of the architecture in which the two transmission lines are disposed in parallel or the integrated architecture with a relatively wide radiant stub, an extension stub 223 that bends and extends may be disposed at one end of the low-frequency lower radiator 222 that is away from the low-frequency upper radiator 221. Extension stubs 223 of the low-frequency lower radiator 222 are disposed in pairs on the two sides of the central axis B2 of the low-frequency radiating element 22, and the extension stubs 223 are distributed on the two sides of the low-frequency lower radiator 222. The extension stub 223 is configured to improve a physical size of the antenna 100, so that an overall size of the antenna wo can be reduced on the premise that a resonance frequency is met, which facilitates a miniaturized design of the antenna 100. Specifically, the extension stub 223 includes a first extension line 2231 and a second extension line 2232, a width of the first extension line 2231 is less than a width of the second extension line 2232, the first extension line 2231 is connected between the second extension line 2232 and the low-frequency lower radiator 222, and the width of each of the first extension line 2231 and the second extension line 2232 refers to a size in the first direction A1.

As shown in FIG. 4, the high-frequency radiating element 21 includes the high-frequency upper radiator 211 and the high-frequency lower radiator 212. In a possible implementation, the high-frequency upper radiator 211 includes two transmission lines 2111 and 2112 that both extend in the second direction A2, and the two transmission lines 2111 and 2112 are symmetrically distributed on two sides of the low-frequency upper radiator 221. In addition, ends of the two transmission lines 2111 and 2112 of the high-frequency upper radiator 211 that are close to the folded antenna 10 face the first connecting section 13 and the second connecting section 14 of the folded antenna 10, and ends of the two transmission lines 2111 and 2112 of the high-frequency upper radiator 211 that are away from the folded antenna 10 are connected by using the upper connecting line 23. The upper connecting line 23 is vertically connected to all of the two transmission lines 2111 and 2112 of the high-frequency upper radiator 211 and the two transmission lines 2211 and 2212 of the low-frequency upper radiator 221.

In a possible implementation, the high-frequency lower radiator 212 includes two transmission lines 2121 and 2122 that are disposed in parallel and extend in the second direction, and the two transmission lines 2121 and 2122 of the high-frequency lower radiator 212 are symmetrically distributed on the two sides of the low-frequency lower radiator 222. The two transmission lines 2121 and 2122 of the high-frequency lower radiator 212 and the two transmission lines 2111 and 2112 of the high-frequency upper radiator 211 may be collinear in a one-to-one correspondence in the second direction. Ends of the two transmission lines 2121 and 2122 of the high-frequency lower radiator 212 that are close to the upper stub are connected by using the lower connecting line 24, and the lower connecting line 24 is connected to all of endpoints of the two transmission lines 2121 and 2122 of the high-frequency lower radiator 212 and one end of the low-frequency lower radiator 222 in the first direction A1.

The extension stub 223 of the low-frequency lower radiator 222 is located on one side of the high-frequency lower radiator 212 that is away from the upper stub. That is, the extension stub 223 of the low-frequency lower radiator 222 occupies an idle space on one side of the high-frequency lower radiator 212 that is away from the upper stub, a physical size of the low-frequency lower radiator 222 is changed without changing the overall size of the antenna, which facilitates setting of the miniaturized antenna.

Figure 10:
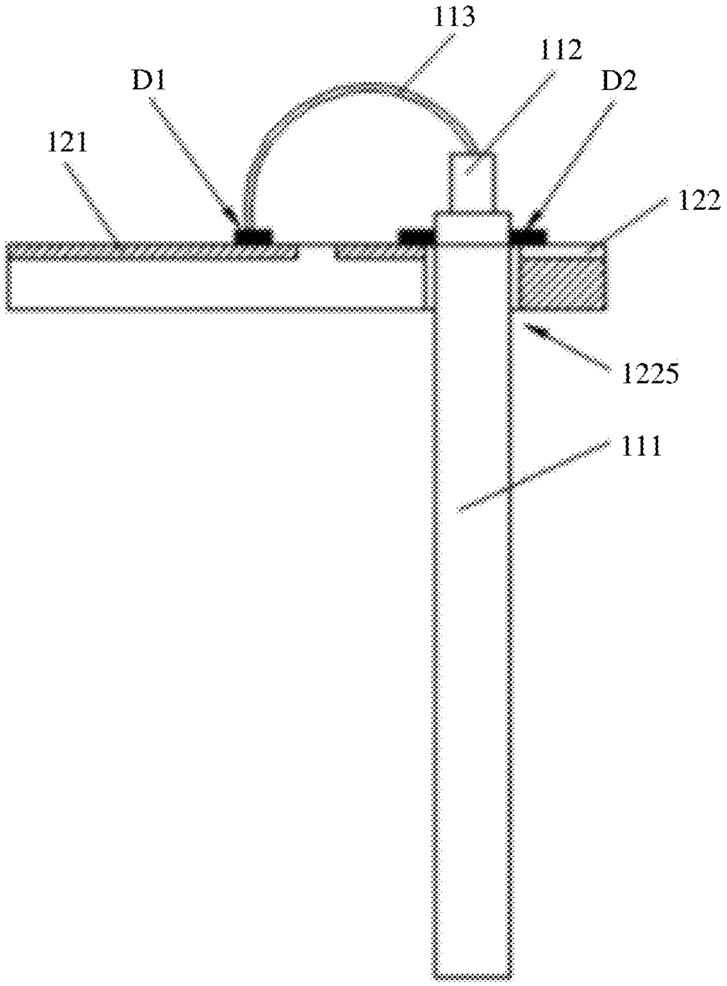
FIG. 10 is a schematic diagram of a feeding structure of a folded antenna in an antenna according to an implementation of this application.

A feeding structure of the folded antenna 10 is specifically as follows: Referring to FIG. 7 and FIG. 8, the folded antenna 10 includes two feeding points that are both located on the second radiant section 12, and the two feeding points are respectively the first feeding point D1 disposed on the first primary body 121 and the second feeding point D2 disposed on the second primary body 122. Referring to FIG. 10, the folded antenna 10 is fed by using the first feeder no. The first feeder no includes a first external conductor 111, a first dielectric insulation pall 112, and a first inner conductor 113. The first feeder no passes through a via on a dielectric plate, that is, the feeding hole 1225 (referring to FIG. 7). The first external conductor 111 is electrically connected to the second feeding point D2, and an electrical connection between the first external conductor in and the second feeding point D2 may be implemented in a welding manner. The first dielectric insulation part 112 and the first inner conductor 113 pass through the feeding hole 1225 and bend, the first inner conductor 113 bends and extends to be electrically connected to the first primary body 121 of the second radiant section 12 of the folded antenna 10, the first inner conductor 113 is electrically connected to the first feeding point D1, and the first dielectric insulation part 112 encloses the first inner conductor 113, so as to ensure insulated isolation between the first inner conductor 113 and the second primary body 122.

A feeding structure of the dipole antenna 20 is specifically as follows: Referring to FIG. 7 and FIG. 8, the dipole antenna 20 includes two feeding points: a third feeding point D3 and a fourth feeding point D4. The two feeding points of the dipole antenna 20 are respectively located on the upper connecting line 23 and the lower connecting line 24. Specifically, the fourth feeding point D4 is located at an intersection between the upper connecting line 23 and the central axis B2 of the dipole antenna 20 (that is, the central axis of the foregoing low-frequency radiating element 22), and the third feeding point D3 is located at an intersection between the lower connecting line 24 and the central axis B2 of the dipole antenna 20.

Referring to FIG. 11, the dipole antenna 20 is fed by using the second feeder 120, and the second feeder 120 may be a coaxial cable, and is configured to transmit an electromagnetic wave signal between the feeding network and the dipole antenna 20. The second feeder 120 includes a second external conductor 1201, a second inner conductor 1203, and a second dielectric insulation part 1202. Specifically, the dipole antenna 20 may be in a microstrip form disposed on the dielectric plate. The dipole antenna 20 is disposed on a first plane, and the first plane may be a surface of the dielectric plate. The dipole antenna 20 and the second feeder 120 may be located on a same surface of the dielectric substrate, or may be respectively located on two opposite surfaces. In this case, the second feeder 120 may pass through the via in the dielectric plate to be electrically connected to the feeding point of the dipole antenna 20. The second feeder 120 may be attached to the first plane. The second feeder 120 extends in the second direction A2 on the first plane, and extends from one end of the lower stub of the dipole antenna 20 that is away from the upper stub to the upper stub. Specifically, the second feeder 120 extends along the central axis B2 of the low-frequency radiating element 22. The second external conductor 121 is electrically connected to the third feeding point D3. The second dielectric insulation part 122 serves as an insulator between the second inner conductor 123 and the second external conductor 121, and the second dielectric insulation part 122 stretches out of the second external conductor 121 into a gap between the upper connecting line 23 and the lower connecting line 24. The second inner conductor 123 stretches out of the second dielectric insulation part 122, and is electrically connected to the fourth feeding point D4 of the dipole antenna 20.

In this embodiment, a current passes through the first feeder no and the second feeder 120, which inevitably causes electromagnetic fields around the feeders. The first feeder no and the second feeder 120 are designed to be orthogonal to make induction fields around the first feeder no and the second feeder 120 orthogonal, so that impact between the induction fields is the least, and transmission efficiency is the highest.

Specifically, the dipole antenna 20 has a high-frequency characteristic and a low-frequency characteristic. By making polarization of the high-frequency radiating element 21 and the low-frequency radiating element 22 orthogonal to the polarization of the folded antenna 10, the polarization of the dipole antenna 20 is orthogonal to the polarization of the folded antenna 10, thereby reducing impact between the dipole antenna 20 and the folded antenna 10 in different operating frequency bands.

In this application, the coupling structure 30 is disposed between the folded antenna 10 and the dipole antenna 20, and the coupling structure 30 may selectively pass through an electromagnetic wave of a fixed frequency band. For example, in a specific implementation of this application, when the low-frequency radiator of the dipole antenna 20 operates in a second frequency band, the coupling structure 30 generates resonance to make a current pass through, so that the folded antenna 10 participates in radiation of the low-frequency radiating element 22 of the dipole antenna 20. In the operating frequency band of the folded antenna 10, that is, in the first frequency band, the coupling structure 30 prevents the current from passing through. Specifically, the coupling structure 30 has a function of passing a low frequency and preventing a high frequency. A specific form of the coupling structure 30 is as follows:

Referring to FIG. 7, FIG. 8, and FIG. 9, in a possible implementation, the coupling structure 30 includes a first coupling line 31 and a second coupling line 32, the first coupling line 31 is connected to the folded antenna 10, the second coupling line 32 is connected to the dipole antenna 20, a gap is formed between the first coupling line 31 and the second coupling line 32, and an equivalent inductor and capacitor connected in series are constituted. By using an electromagnetic coupling effect between the first coupling line 31 and the second coupling line 32, the folded antenna 10 and the dipole antenna 20 are connected together to form an integrated antenna architecture.

In this implementation, the first coupling line 31 and the second coupling line 32 are linear, and both an extension direction of the first coupling line 31 and that of the second coupling line 32 are the second direction A2. In the first direction A1, a part of the first coupling line 31 and a part of the second coupling line 32 are disposed in a laminated manner, and a gap is formed. The first coupling line 31 is perpendicular to the primary radiator of the folded antenna 10. Specifically, the first coupling line 31 is perpendicular to the second radiant section 12, and the second coupling line 32 is parallel to the first coupling line 31. Gaps between the first coupling line 31 and the second coupling line 32 are equally distributed, which helps to tune a resonance frequency.

Referring to FIG. 11, in another implementation, there are two second coupling lines 32, and the two second coupling lines 32 are disposed in parallel on two sides of the first coupling line 31. Specifically, an interval space is formed between the low-frequency upper radiating element 221 of the dipole antenna 20 and the folded antenna 10, and the coupling structure 30 is disposed in the interval space. The two second coupling lines 32 form two parallel capacitor structures on the two sides of the first coupling line 31, and a coplanar waveguide-like structure is formed. A coupling factor is increased by using double gaps, so as to tune the frequency. In this architecture, a distance between the folded antenna 10 and the dipole antenna 20 can be reduced, that is, a length of a coupled stripline in the second direction can be reduced, which facilitates an overall small-size design of the antenna.

In another implementation, the first coupling line 31 and the second coupling line 32 each may alternatively have a bent extension part. For example, the first coupling line 31 and the second coupling line 32 are each designed as an L-shaped or arc-shaped structure, provided that a gap is formed between the first coupling line 31 and the second coupling line 32, and an equivalent capacitor and inductor connected in series are constituted.

In a specific debugging process, a length and a width of each of the first coupling line 31 and the second coupling line 32 and a gap therebetween may be adjusted based on different operating frequency and bandwidth requirements, or the resonance frequency may be adjusted by adjusting extension shapes of the first coupling line 31 and the second coupling line 32.

When the antenna operates in the second frequency band, a distributed inductor and capacitor formed by the first coupling line 31 and the second coupling line 32 form resonance, so that impedance of a series circuit is small, which is approximate to a direct through-connection. When the antenna operates in the first frequency band, the series circuit formed by the first coupling line 31 and the second coupling line 32 is in a non-resonant state, presents a high impedance characteristic, and is approximate to a disconnected effect. In this implementation, an LC circuit connected in series is formed by using two coupling lines, so that a function of passing a low frequency and preventing a high frequency may be implemented. The coupling structure 30 provided in this application is connected between the folded antenna 10 and the dipole antenna 20, has an advantage of a simple structure and space saving, and facilitates the miniaturized design of the antenna.

Figure 12:
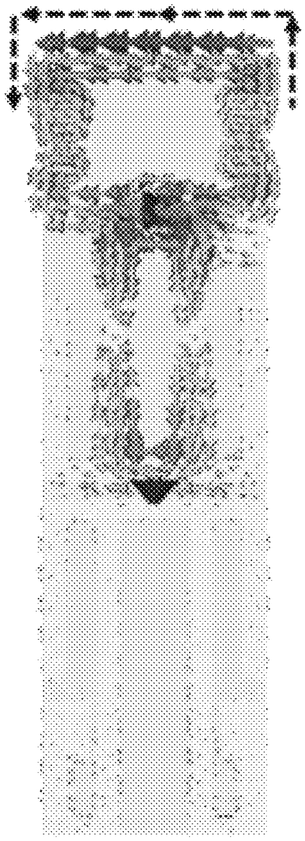
FIG. 12 is a schematic diagram of current distribution of an antenna in a first frequency band state according to an implementation of this application.
Figure 13:
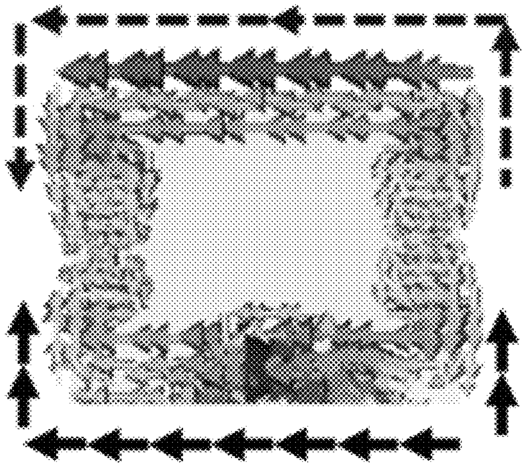
FIG. 13 is a schematic diagram of current distribution of a folded antenna when an antenna is in a first frequency band state according to an implementation of this application.

When the folded antenna 10 is fed by the first feeder no, the folded antenna 10 operates in a state of the first frequency band, that is, Sub7G: 6 to 7 GHz. Current distribution of the antenna is shown in FIG. 12 and FIG. 13. A direction indicated by an arrow in the figure is current distribution and a current direction. It may be clearly seen in FIG. 12 that few currents flow into the dipole antenna 20. FIG. 13 is a captured view of FIG. 12, and FIG. 13 mainly represents current distribution on the folded antenna 10. In particular, it is clearly seen in FIG. 13 that current distribution in the second radiant section 12 is the same as current distribution in the first radiant section 11, because the first radiant section 11 and the second radiant section 12 form energy superposition. When the antenna in this application is in an operating state of the first frequency band, the coupling structure 30 has a high impedance characteristic, so that the currents are concentrated on the folded antenna 10, there are only a few currents distributed on the dipole antenna 20, and the coupling structure 30 forms an isolation effect between the dipole antenna 20 and the folded antenna 10. The current distribution on the first radiant section 11 and that on the second radiant section 12 are in a horizontal state, and the arrow direction in the figure is from right to left. In addition, both a part of the first connecting section 13 and a part of the second connecting section 14 participate in radiation. A current of an upper half flows upward to the first radiant section 11 from a position in which the fifth line 141 of the second connecting section 14 is connected to the second cabling 142 of the second connecting section 14, flows leftward to the third line 131 of the first connecting section 13 along the first radiant section 11, and then flows to the first cabling 132 along the third line 131. A current of a lower half flows downward to the second radiant section 12 from a position in which the sixth line of the second connecting section 14 is connected to the second cabling 142 of the second connecting section 14, and then flows leftward to the fourth line 133 of the first connecting section 13 along the second radiant section 12, and then flows upward to the first cabling 132 along the fourth line 133. A center position of the first cabling 132 and the second cabling 142 in the second direction is a current zero.

Figure 14:
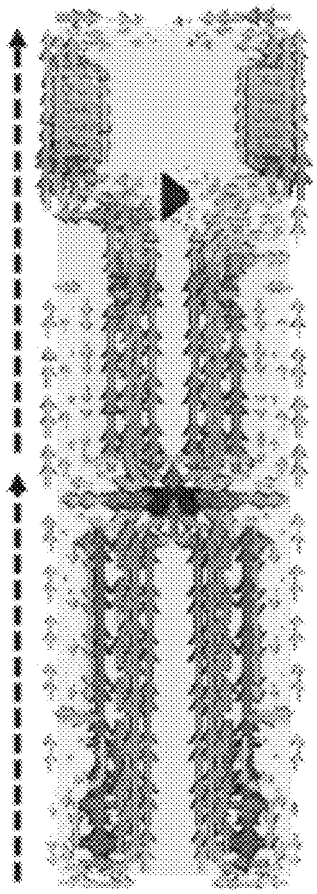
FIG. 14 is a schematic diagram of current distribution of an antenna in a second frequency band state according to an implementation of this application.

When the dipole antenna 20 is fed by the second feeder 120, and the dipole antenna 20 operates in a state of the second frequency band, that is, 2.4 GHz to 2.5 GHz, in this case, the low-frequency radiating element 22 of the dipole antenna 20 operates, taking a 2.45 GHz signal as an example, current distribution of the antenna is shown in FIG. 14. In the second frequency band, the coupling structure 30 forms resonance, so that impedance of a series circuit is small, which is approximate to a short statue. The folded antenna 10 participates in operation of the low-frequency radiating element 22. The current flows in the second direction, and a direction indicated by an arrow on the left side in FIG. 14 is current distribution and a current direction. Clearly, the current flows from one end of the low-frequency radiating element 22 that is away from the folded antenna 10 to one end of the folded antenna 10 that is close to the low-frequency radiating element 22, that is, the current flows from a bottom end of the antenna to a top end thereof, and directly passes through the coupling structure 30 in the middle.

Figure 15:
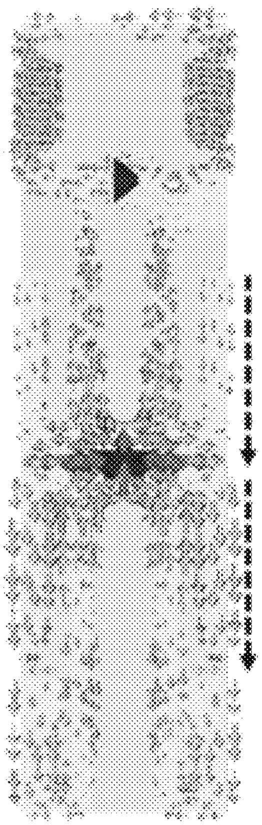
FIG. 15 is a schematic diagram of current distribution of an antenna in a fourth frequency band state according to an implementation of this application.

When the dipole antenna 20 operates in the fourth frequency band, that is, Sub7G: 6 to 7 GHz, taking a 6.5 GHz signal as an example, current distribution of the antenna is shown in FIG. 15. In the fourth frequency band, currents are mainly distributed on the high-frequency radiating element 21 of the dipole antenna 20. For example, current distribution and a current direction are indicated by an arrow on the right side in FIG. 15. In this case, the coupling structure 30 has the high impedance characteristic, so that the currents are concentrated on the high-frequency radiating element 21, and the currents flow in the second direction from one end of the high-frequency radiating element 21 that is close to the folded antenna 10 to one end of the high-frequency radiating element 21 that is away from the folded antenna 10. The coupling structure 30 forms an isolation effect between the dipole antenna 20 and the folded antenna 10.

Figure 16:
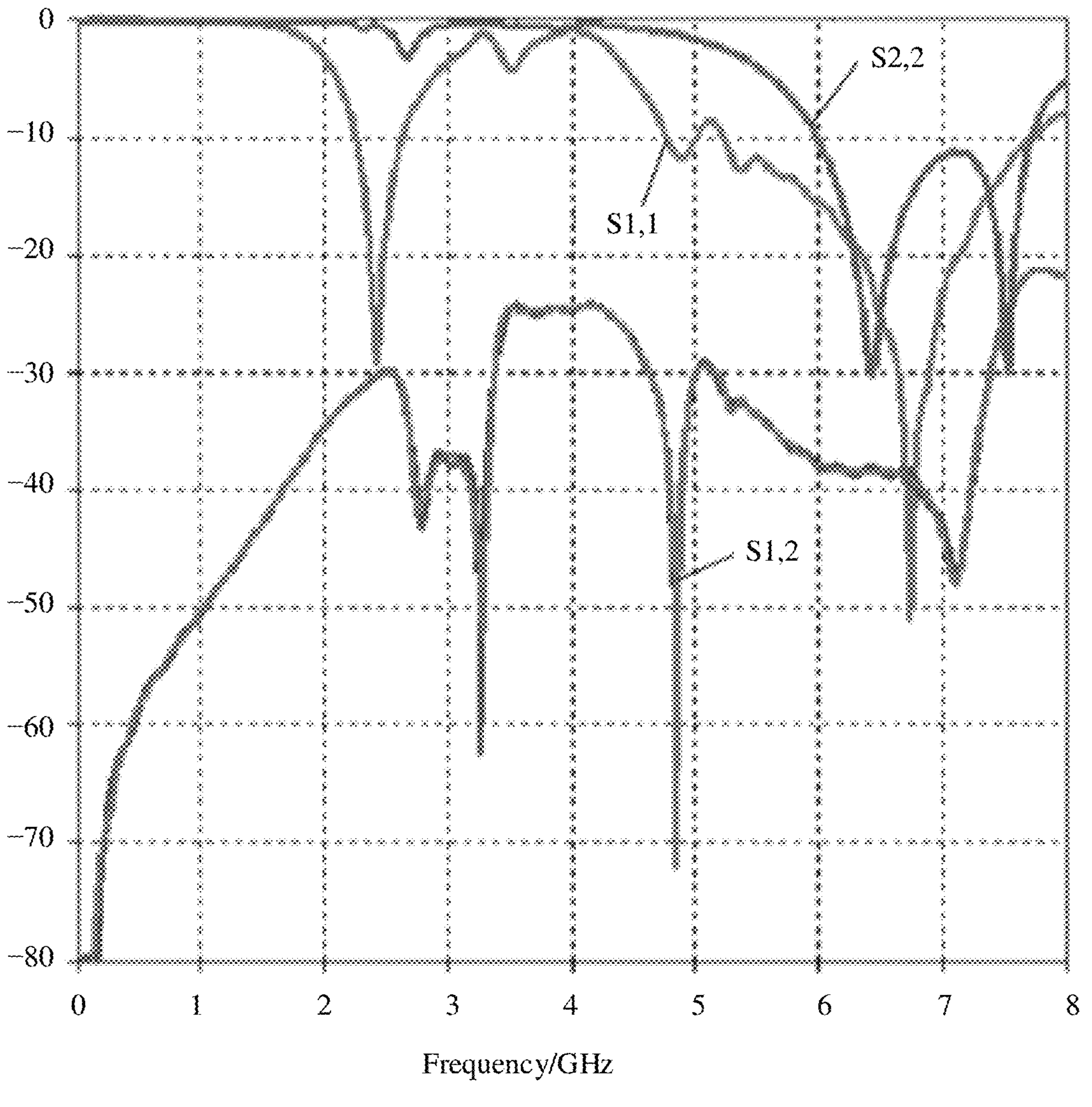
FIG. 16 is a diagram of a return loss curve of an antenna according to an implementation of this application.

FIG. 16 is a return loss curve of the antenna that is applied to a Wi-Fi product and provided in this application. S1,1 reflects a port characteristic of the dipole antenna 20, and it can be learned from S1,1 that the dipole antenna 20 covers three frequency spectrum intervals of 2G, 5G, and 6G. S2,2 reflects a port characteristic of the folded antenna 10, and the antenna separately covers a 6G frequency band. S1,2 reflects isolation between two ports of the folded antenna 10 and the dipole antenna 20. A lower value indicates lower impact between the two, and it can be learned from the figure that isolation in a Wi-Fi frequency band is greater than −30 dB. There are three frequency bands covered by the antenna provided in this application, for example, 2G, 5G, and 6G, respectively. The antenna includes two antenna feeding ports, and may implement output of four frequency bands, that is, 2G, 5G, 6G, and 6G. In addition, the polarization of the folded antenna 10 and the polarization of the dipole antenna 20 are orthogonal, because the antenna provided in this application is a four-band dual-polarization antenna. It can be seen from the figure that a radiator of the folded antenna 10 has a very good broadband characteristic, a frequency covers 6 GHz to 7.8 GHz, and a radiator of the dipole antenna 20 has a three-band characteristic that covers 2.4G, 5G, and 6G.

Figure 17:
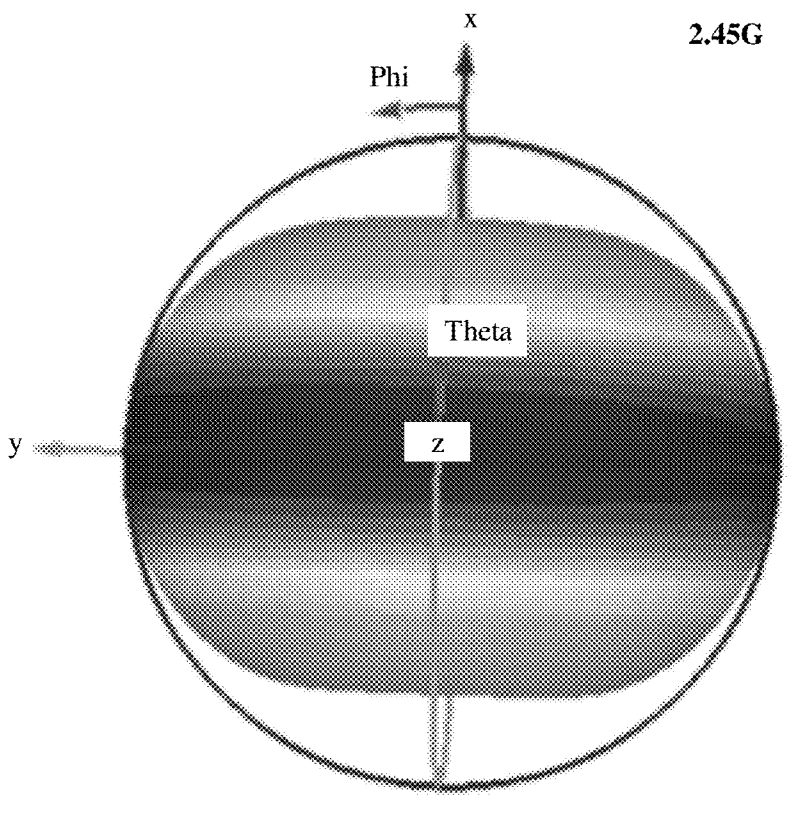
FIG. 17 and FIG. 18 are antenna radiation patterns corresponding to a dipole antenna of an antenna in 2G frequency and 6G frequency according to an implementation of this application.
Figure 18:
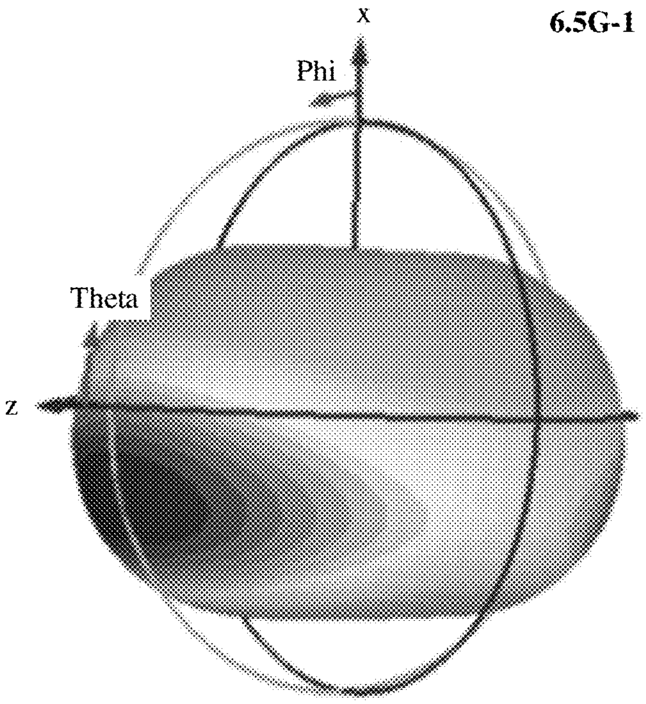
Figure 19:
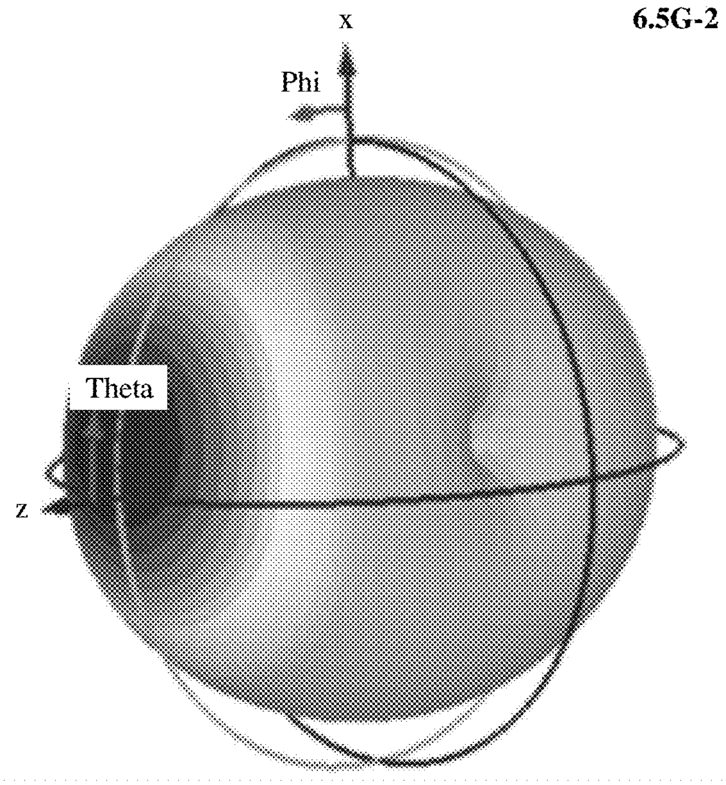
FIG. 19 is an antenna radiation pattern corresponding to a folded antenna of an antenna in 6G frequency according to an implementation of this application.

FIG. 17 and FIG. 18 are antenna radiation patterns corresponding to the dipole antenna 20 in the 2G and 6G frequencies. FIG. 19 is an antenna radiation pattern corresponding to the folded antenna 10 in the 6G frequency. It can be seen that the horizontal polarized radiator of the folded antenna 10 has a forward and backward bidirectional radiation characteristic with a wide beam and a high gain, and the dipole antenna 20 has omnidirectional radiation performance.

The antenna provided in this application has an advantage of a small size on the premise that radiation performance of the folded antenna 10 and the dipole antenna 20 is met. Specifically, in the second direction A2, a total length of the antenna is λL/2, and λL is a resonance wavelength of the low-frequency radiating element 22 of the dipole antenna 20. In the first direction A1, a total length of the antenna is less than λh/2, and λh is a resonance wavelength of the folded antenna 10. In a specific implementation, in the first direction A1, a total length of the antenna is from λh/4 to λh/3. A size of the folded antenna 10 in the second direction A2 is from λh/10 to λh/2.

The antenna provided in this application is not limited to a microstrip form printed on the dielectric plate, or may be a metal structure or a combination of a microstrip and a metal structure. For example, the folded antenna 10 is a metal structure, the dipole antenna 20 is a microstrip structure printed on the dielectric plate, and the coupling structure may be a microstrip structure. The coupling structure 30 and the folded antenna 10 may be welded to be fixed, be electrically connected by using a metal dome, or the like.

What is disclosed above is merely example embodiments of this application, and certainly is not intended to limit the protection scope of this application. A person of ordinary skill in the art may understand that all or some of processes that implement the foregoing embodiments and equivalent modifications made in accordance with the claims of this application shall fall within the scope of this application.

What is claimed is:

1. A device, comprising:

a folded antenna, wherein a primary radiator of the folded antenna extends in a first direction;

a dipole antenna, wherein a primary radiator of the dipole antenna extends in a second direction, and the first direction is orthogonal to the second direction; and a coupling circuit;

wherein in the second direction, the folded antenna is disposed at a first end of the dipole antenna;

wherein an operating frequency of the folded antenna is a first frequency band, the operating frequency of the dipole antenna comprises a second frequency band, and the first frequency band is higher than the second frequency band;

wherein the coupling circuit is connected between the folded antenna and the dipole antenna; and wherein in the second frequency band, the coupling circuit generates resonance, and in the first frequency band, the coupling circuit has an isolation function.

2. The device according to claim 1, wherein the coupling circuit comprises a first coupling line and a second coupling line, the first coupling line is connected to the folded antenna, the second coupling line is connected to the dipole antenna, a gap is formed between the first coupling line and the second coupling line, and the coupling circuit is configured to act as an equivalent inductor and capacitor connected in series.

3. The device according to claim 2, wherein the first coupling line is perpendicular to the primary radiator of the folded antenna, and the second coupling line is parallel to the first coupling line.

4. The device according to claim 2, wherein the coupling circuit comprises two second coupling lines, and the two second coupling lines are disposed on two sides of the first coupling line in parallel.

5. The device according to claim 1, wherein the primary radiator of the folded antenna comprises a first radiant section and a second radiant section that are opposite to each other across a gap, the first radiant section comprises a first plurality of protrusions and the second radiant section comprises a second plurality of protrusions that are interleaved with the first plurality of protrusions; and wherein the folded antenna further comprises a first connecting section and a second connecting section that are connected between the first radiant section and the second radiant section and that constitute a ring-shaped architecture together with the first radiant section and the second radiant section, wherein in the second frequency band, the first connecting section and the second connecting section participate in radiation of the dipole antenna.

6. The device according to claim 5, wherein the first connecting section comprises a first cable that extends reciprocally in a third direction, the first cable is configured to form radiation-free inductive loading, and the third direction forms an angle with the second direction.

7. The device according to claim 6, wherein an accommodating space is formed between the first radiant section and the second radiant section, and an extension path of the first cable is located in the accommodating space.

8. The device according to claim 7, wherein the first cable extends in a plurality of reciprocal sections into the accommodating space.

9. The device according to claim 7, wherein the extension path of the first cable is serpentine, sawtooth, or wavy.

10. The device according to claim 7, wherein the first cable comprises a plurality of first lines that are parallel to each other, and adjacent first lines are connected to each other by using a second line.

11. The device according to claim 6, wherein the first connecting section further comprises a third line and a fourth line that are symmetrically distributed on two sides of the first cable, the first cable is connected to the first radiant section using the third line, and the first cable is connected to the second radiant section by using the fourth line.

12. The device according to claim 11, wherein extension directions of both the third line and the fourth line are the second direction.

13. The device according to claim 11, wherein the second connecting section comprises a fifth line, a second cable, and a sixth line that are sequentially connected between the first radiant section and the second radiant section, the second cable extends reciprocally in the third direction and is configured to form radiation-free inductive loading, and the fifth line forms a half-wave radiator together with the third line and the first radiant section.

14. The device according to claim 5, wherein the second radiant section comprises a first primary body, a second primary body, and a feeding stub, the first primary body comprises a first connecting end and a first feeding end, the first connecting end is connected to the first connecting section, the second primary body comprises a second connecting end and a second feeding end, the second connecting end is connected to the second connecting section, the first feeding end and the second feeding end are disposed opposite to each other across a gap, the feeding stub is connected to the first feeding end, the feeding stub forms an enclosure zone with an opening facing the second primary body, at least a part of the second primary body extends into the enclosure zone, the second feeding end is located in the enclosure zone, the feeding stub forms a coplanar waveguide structure with the part of the second primary body in the enclosure zone, a feeding hole extends in the second primary body, and the feeding hole is configured to be used for a first feeder to pass through.

15. The device according to claim 14, wherein an external conductor of the first feeder is electrically connected to the second primary body, and an inner conductor of the first feeder is bent after passing through the feeding hole, and is electrically connected to the first primary body.

16. The device according to claim 1, wherein the dipole antenna comprises a high-frequency radiating element and a low-frequency radiating element, the coupling circuit is connected to the low-frequency radiating element, an operating frequency of the low-frequency radiating element is the second frequency band, operating frequencies of the high-frequency radiating element are a third frequency band and a fourth frequency band, the fourth frequency band is higher than the third frequency band, and the third frequency band is higher than the second frequency band.

17. The device according to claim 16, wherein the low-frequency radiating element is an axisymmetric structure, a symmetric axis of the low-frequency radiating element is a central axis, and the device comprises two coupling circuits which are respectively on two sides of the central axis.

18. The device according to claim 17, wherein the high-frequency radiating element is symmetrically distributed on two sides of the low-frequency radiating element, the central axis is also a symmetric axis of the high-frequency radiating element, the primary radiator of the folded antenna comprises a first radiant section and a second radiant section that are opposite to each other across a gap, the first radiant section comprises a first plurality of protrusions and the second radiant section comprises a second plurality of protrusions that are interleaved with the first plurality of protrusions; and wherein the folded antenna further comprises a first connecting section and a second connecting section that are connected between the first radiant section and the second radiant section and that constitute a ring-shaped architecture together with the first radiant section and the second radiant section, wherein in the second frequency band, the first connecting section and the second connecting section participate in radiation of the low-frequency radiating element, and in the second direction, the high-frequency radiating element faces the first connecting section and the second connecting section.

19. A first device, comprising:

a first feeder;

a second feeder; and a second device, comprising:

a folded antenna, wherein a primary radiator of the folded antenna extends in a first direction;

a dipole antenna, wherein a primary radiator of the dipole antenna extends in a second direction, and the first direction is orthogonal to the second direction; and a coupling circuit;

wherein in the second direction, the folded antenna is disposed at a first end of the dipole antenna;

wherein an operating frequency of the folded antenna is a first frequency band, the operating frequency of the dipole antenna comprises a second frequency band, and the first frequency band is higher than the second frequency band;

wherein the coupling circuit is connected between the folded antenna and the dipole antenna;

wherein in the second frequency band, the coupling circuit generates resonance, and in the first frequency band, the coupling circuit has an isolation function; and wherein the first feeder is connected to the folded antenna, and the second feeder is connected to the dipole antenna.

20. A wireless network device, comprising:

a feeding network; and a first device, comprising:

a first feeder;

a second feeder; and a second device, comprising:

a folded antenna, wherein a primary radiator of the folded antenna extends in a first direction;

a dipole antenna, wherein a primary radiator of the dipole antenna extends in a second direction, and the first direction is orthogonal to the second direction; and a coupling circuit;

wherein in the second direction, the folded antenna is disposed at a first end of the dipole antenna;

wherein an operating frequency of the folded antenna is a first frequency band, the operating frequency of the dipole antenna comprises a second frequency band, and the first frequency band is higher than the second frequency band;

wherein the coupling circuit is connected between the folded antenna and the dipole antenna;

wherein in the second frequency band, the coupling circuit generates resonance, and in the first frequency band, the coupling circuit has an isolation function;

wherein the first feeder is connected to the folded antenna, and the second feeder is connected to the dipole antenna; and wherein the feeding network is connected to the first feeder and the second feeder of the first device to implement excitation on the folded antenna and the dipole antenna.

* * * * *